US010882351B2

(12) United States Patent
Walter et al.

(10) Patent No.: US 10,882,351 B2
(45) Date of Patent: Jan. 5, 2021

(54) MULTILAYER BODY AND METHOD FOR PRODUCING SAME

(71) Applicants: OVD Kinegram AG, Zug (CH); LEONHARD KURZ Stiftung & Co. KG, Furth (DE)

(72) Inventors: Harald Walter, Horgen (CH); Ludwig Brehm, Adelsdorf (DE); Sebastian Mader, Baar (CH); Wayne Robert Tompkin, Baden (CH); Eser Alper Unal, Furth (DE)

(73) Assignees: LEONHARD KURZ Stiftung & Co. KG, Furth (DE); OVD KINEGRAM AG, Zug (CH)

( * ) Notice: Subject to any disclaimer, the term of this patent is extended or adjusted under 35 U.S.C. 154(b) by 0 days.

(21) Appl. No.: 15/543,093

(22) PCT Filed: Jan. 11, 2016

(86) PCT No.: PCT/EP2016/050381
§ 371 (c)(1),
(2) Date: Jul. 12, 2017

(87) PCT Pub. No.: WO2016/113220
PCT Pub. Date: Jul. 21, 2016

(65) Prior Publication Data
US 2017/0368864 A1   Dec. 28, 2017

(30) Foreign Application Priority Data
Jan. 14, 2015   (DE) .................. 10 2015 100 520

(51) Int. Cl.
*B42D 25/23*   (2014.01)
*G02B 5/18*   (2006.01)
(Continued)

(52) U.S. Cl.
CPC ............. *B42D 25/23* (2014.10); *B42D 25/24* (2014.10); *B42D 25/29* (2014.10); *B42D 25/324* (2014.10);
(Continued)

(58) Field of Classification Search
CPC ........ B42D 25/23; B42D 25/24; B42D 25/29; B42D 25/324; B42D 25/328; B42D 25/351; B42D 25/45
See application file for complete search history.

(56) References Cited

U.S. PATENT DOCUMENTS 7,821,716 B2   10/2010   Staub et al.
8,367,277 B2   2/2013   Brehm et al.
(Continued)

FOREIGN PATENT DOCUMENTS

AU   2010268080   6/2010
CN   103561963 A   2/2014
(Continued)

OTHER PUBLICATIONS

Chinese Office Action for corresponding Chinese Patent Application No. 20168005792.9, pp. 1-25, (dated Oct. 15, 2018).
Japanese Office Action dated Dec. 10, 2019.

*Primary Examiner* — David R Dunn
*Assistant Examiner* — Christopher E Veraa
(74) *Attorney, Agent, or Firm* — Hoffmann & Baron, LLP

(57) ABSTRACT

A method for producing a multilayer body, with the steps of:
a) providing a substrate film with a replication layer;
b) molding a surface relief appearing to the observer in the form of a three-dimensional free-form surface, which is formed in particular by structures with a lens-like design generating a magnifying, demagnifying or distorting effect, into a surface of the replication layer;
c) applying a first metal layer to the surface of the replication layer forming the surface relief;

(Continued)

d) wet-chemically applying an at least partially transparent spacer layer to the metal layer;
e) applying a second metal layer to the spacer layer.

36 Claims, 27 Drawing Sheets

(51) Int. Cl.
 *B42D 25/29* (2014.01)
 *B42D 25/45* (2014.01)
 *B42D 25/324* (2014.01)
 *B42D 25/351* (2014.01)
 *B42D 25/328* (2014.01)
 *B42D 25/24* (2014.01)
 *B05D 7/24* (2006.01)

(52) U.S. Cl.
 CPC ......... *B42D 25/328* (2014.10); *B42D 25/351* (2014.10); *B42D 25/45* (2014.10); *G02B 5/1842* (2013.01); *G02B 5/1847* (2013.01); *B05D 7/24* (2013.01)

(56) References Cited

U.S. PATENT DOCUMENTS

| | | | |
|---|---|---|---|
| 2007/0081246 A1 | 4/2007 | Stuck et al. | |
| 2007/0095465 A1* | 5/2007 | Katschorek | G03B 27/12 156/272.2 |
| 2007/0292636 A1 | 12/2007 | Phillips et al. | |
| 2009/0201586 A1 | 8/2009 | Wild et al. | |
| 2010/0194091 A1 | 8/2010 | Heim et al. | |
| 2011/0045248 A1* | 2/2011 | Hoffmuller | B41M 1/04 428/156 |
| 2013/0140806 A1* | 6/2013 | Wilkinson | B41M 7/0045 283/109 |
| 2013/0181434 A1* | 7/2013 | Prique | G09F 3/00 283/72 |
| 2013/0285361 A1* | 10/2013 | Staub | B42D 25/328 283/85 |
| 2014/0037898 A1 | 2/2014 | Tompkin et al. | |
| 2014/0247499 A1 | 9/2014 | Doublet et al. | |
| 2014/0346766 A1* | 11/2014 | Walter | G02B 5/286 283/81 |
| 2015/0241845 A1* | 8/2015 | Richert | C09D 5/29 430/2 |
| 2015/0298482 A1* | 10/2015 | Walter | G02B 5/008 359/572 |
| 2016/0003990 A1* | 1/2016 | Tsukahara | B42D 25/328 359/567 |
| 2016/0059621 A1* | 3/2016 | Szumski | B05D 5/061 428/29 |

FOREIGN PATENT DOCUMENTS

| | | |
|---|---|---|
| DE | 4017220 | 1/1991 |
| DE | 102006037431 | 4/2008 |
| DE | 102006050047 | 4/2008 |
| DE | 102009031386 | 1/2011 |
| DE | 202014104199 | 11/2014 |
| EP | 2264491 | 12/2010 |
| JP | 2008530600 A | 8/2008 |
| JP | 2011075878 A | 4/2011 |
| WO | WO2003095227 | 11/2003 |

* cited by examiner

A)

B)

MULTILAYER BODY AND METHOD FOR PRODUCING SAME

This application claims priority based on an International Application filed under the Patent Cooperation Treaty, PCT/EP2016/050381, filed Jan. 11, 2016, which claims priority to DE102015100520.4, filed Jan. 14, 2015.

BACKGROUND OF THE INVENTION

The invention relates to a method for producing a multilayer body, a multilayer body produced in this way, as well as a security element with such a multilayer body.

It is known to use thin-film systems in multilayer bodies which are used as security elements. For this, a semi-transparent metal layer, a transparent spacer layer and a second opaque metal layer are applied to a substrate by vacuum deposition, with the result that a so-called Fabry-Pérot system is obtained which displays a color change effect when the angle of observation or illumination is changed. The substrate can be, for example, a self-supporting single-layered or multilayer film, which can have still further applied layers, for example varnish layers.

Investigations have now shown that the color change effect of such a security feature displays almost the same color impression over the entire area when observed perpendicularly or at relatively acute observation angles α of from approx. 0° to 20°, even if a surface relief structure is molded into the substrate or into a varnish layer applied to the substrate.

By a surface relief structure is meant a surface relief in the form of a free-form surface which is formed in particular by structures with a lens-like design generating a magnifying, demagnifying or distorting effect. A surface relief structure is preferably formed by a surface relief in the form of a Fresnel lens structure.

SUMMARY OF THE INVENTION

The object of the present invention is to provide a multilayer body as well as a method for producing same, which guarantees an improved optical impression and increased security.

This object is achieved by a method with the features of claim 1, by a multilayer body with the features of claim 14 as well as by a security document with the features of claim 32.

Such a method for producing a multilayer body comprises the steps of:
a) providing a substrate film with a replication layer;
b) molding a surface relief appearing to the observer in the form of a three-dimensional free-form surface, which is formed in particular by structures with a lens-like design generating a magnifying, demagnifying or distorting effect, into a surface of the replication layer;
c) applying a first metal layer to the surface of the replication layer forming the surface relief;
d) wet-chemically applying an at least partially transparent spacer layer to the first metal layer;
e) applying a second metal layer to the spacer layer, wherein at least one of the two metal layers is formed semi-transparent.

Optionally, one of the two metal layers can be formed as an opaque mirror layer.

A multilayer body is hereby obtained which has the following layer structure:
a substrate film;
a replication layer, applied to a surface of the substrate film, into the surface of which facing away from the substrate film a surface relief appearing to the observer in the form of a three-dimensional free-form surface is introduced which comprises in particular structures with a lens-like design generating a magnifying, demagnifying or distorting effect;
a first metal layer, which is arranged on the surface of the replication layer forming the surface relief;
a wet-chemically applied, at least partially transparent spacer layer, which is applied to a surface of the first metal layer facing away from the replication layer, and which optionally forms a further surface relief;
a second metal layer, which is applied to a surface of the spacer layer facing away from the first metal layer, wherein at least one of the two metal layers is formed semi-transparent.

Optionally, one of the two metal layers can be formed as an opaque mirror layer.

A layer structure is thus obtained in which a thin-film system, formed of the first metal layer, the spacer layer and the second metal layer, is combined with a surface relief. As the spacer layer is applied to the (metalized) surface relief of the replication layer, the two boundary surfaces of the spacer layer can thus each form a surface relief. These two surface reliefs are more or less correlated, as will be explained in the following.

If the transparent spacer layer is applied wet-chemically, the surface relief which forms in the surface of the transparent spacer layer facing away from the replication layer is present preferably relaxed—thus weakened. The correlation of the two surface reliefs thus decreases.

In particular the structure depth in the further surface relief is reduced compared with the surface relief of the replication layer. How strongly relaxed, i.e. weakened, the structures in the second boundary surface are depends, among other things, on the wet-chemical coating parameters, in particular the viscosity and polarity, as well as the material system, in particular polymer system, of the varnish system used, but also the solvents used. The wet and the dry layer thicknesses also have a significant influence.

Furthermore, measurements have shown that not only does the structure depth at the second boundary surface decrease, but the shape of the structures can sometimes also change. If, for example, a Fresnel structure with blazed grating is introduced into the replication layer, it could thus be shown that the Fresnel structures at the second boundary surface are present not only less deep, but rather also sinusoidal.

Because of the shape change of the further surface relief compared with the surface relief of the replication layer, the resulting spacer layer between these two surface reliefs thus has a variable layer thickness. As the color impression of a thin-film system is determined by the layer thickness, a multilayer body the color of which changes over its surface is thus obtained. In particular, color gradients or also color-to-gray gradients can thus be realized. Here and in the following, "gray" is to stand for uncolored or else achromatic.

Different optical effects can additionally be realized by the free-form surface of the surface relief, for example the formation of letters, numbers, but also any other objects which appear to protrude from the surface virtually or to dip behind the surface virtually. Further examples of the objects that can be represented are schematized mountains, country outlines, animals, plants or plant parts such as leaves or also buildings, bridges, gates as well as faces or portraits, in particular of famous personalities, etc. Furthermore, e.g., logos which appear as if they were bulging out and/or set back vis-à-vis the substrate surface, i.e. as if a domed surface were present in the area of the free-form surface, can be generated. The objects thus obtain spatial depth, wherein particularly characteristic optical effects which greatly increase the memorability and thus the identification effect of corresponding optically variable elements precisely in combination with the color variation generated by the thin-film system can additionally be achieved in the case of suitable formation and arrangement of partial areas with a lens-like design.

Such a multilayer body can be attached to a security document, which is preferably formed as a banknote, identification document, visa document, credit card, driver's license or the like. In this way, a visually appealing security document that at the same time has a particularly good protection against forgery is obtained.

By an at least partially transparent spacer layer is meant here a layer with a transmittance or transmission of at least 50%, preferably at least 75% and particularly preferably at least 90%. The data are understood as the average of the transmittance or transmission over the visible wavelength range from 430 nm to 690 nm. The wavelengths visible to humans lie in the range between 380 nm and 780 nm of the electromagnetic spectrum, wherein the relative sensitivity of the eye in photopic vision below 430 nm and above 690 nm is typically less than 1% of the maximum value at 555 nm.

In a preferred embodiment the spacer layer is applied by gravure printing, curtain coating, slot coating, spin coating or dip coating. By means of the named methods, liquid media, in particular varnishes, can be reliably applied with a predetermined wet layer thickness. Some wet-chemical methods for applying the spacer layer are suitable for generating spacer layers with a layer thickness that varies in a locally targeted manner. For example, in the case of gravure printing, this local variation can be realized by varying the ink cell parameters on the printing roller. This makes it possible to generate two- or multi-colored effects in a targeted manner. Furthermore, with some wet-chemical methods the spacer layer can be applied not only over the whole surface, but also partially.

The spacer layer is preferably generated by applying a varnish, in particular based on one of the following material or polymer systems, in order thus to achieve the desired optical properties: nitrocellulose, epoxy, polyester, rosin, acrylate, alkyd, melamine, PVA, PVC, isocyanate or urethane systems. The varnish can also consist of a mixture of two or more of the material or polymer systems.

Further properties of such varnishes, such as for example the viscosity or polarity, can be set to desired and advantageous values through suitable additives. Furthermore, invisible security features can also additionally be added through additives. For example, UV- or IR-active luminescent dyes, in particular fluorescent dyes, can be added to the varnishes.

It is furthermore expedient if a varnish with a viscosity of from 5 mPa·s to 250 mPa·s, preferably from 15 mPa·s to 200 mPa·s and particularly preferably between 20 and 170 mPa·s, is used for the application of the spacer layer.

With respect to the polarity of the varnish it is advantageous if the solvents of the varnish consist of solvents with a polarity index greater than 3.0 at a rate of at least 30% by mass, preferably of solvents with a polarity index greater than 3.0 at a rate of at least 50% by mass. The polarity index is understood here as in Table 2 of EP 2264491 A1.

The wet-chemical coating parameters, in particular the viscosity and polarity, as well as the material system, in particular polymer system, of the varnish used, but also the solvent used can influence how strongly the surface relief of the replication layer is reproduced in the surface of the spacer layer. This can influence the optical properties of the thin-film system described at the beginning.

The spacer layer is preferably applied with a wet layer thickness of from 1 µm to 20 µm, preferably from 2 µm to 10 µm. Both the wet and the dry layer thicknesses also influence the resulting structure depth of the relief forming in the side of the spacer layer facing away from the replication layer and thus the optical properties of the resulting thin-film system.

Furthermore it is expedient if the spacer layer is dried after application, in particular at a temperature of from 40° C. to 200° C., preferably from 40° C. to 150° C. There is preferably a temperature gradient in the dryer of the printing machine, wherein the temperature is between 40° C. and 60° C. at the start of the dryer and increases to 100° C. to 150° C. at the end of the dryer.

A controlled evaporation as well as a controlled curing of the varnish of the spacer layer is hereby guaranteed with, simultaneously, sufficient time for the relaxation of the surface of the spacer layer, which also has an influence on the resulting surface relief and makes a process-stable manufacture of the multilayer body with constant quality possible.

By a semi-transparent metal layer is meant a metal layer with a transmittance or transmission of at least 10%. It preferably lies between 20% and 80%, particularly preferably between 25% and 65%. Alternatively, the optical density OD is often stated instead of the transmission. The optical density is less than or equal to 1.0 in the case of the semi-transparent metal layers. It preferably lies between 0.7 and 0.1 and particularly preferably between 0.6 and 0.18. At the same time the reflectivity of the semi-transparent metal layer is further preferably at least 10% and preferably more than 15%. The data are understood as the average of the transmittance or transmission as well as the reflectivity over the visible wavelength range from 430 nm to 690 nm.

It is furthermore preferred if the semi-transparent metal layer is generated by vacuum deposition of Cr, Al, Cu, Ti, Ni, Ag or alloys with these metals such as e.g. $Al_{96}\%$ $Cu_4\%$ or Inconel, in particular with a layer thickness of from 2 nm to 20 nm, preferably from 4 nm to 15 nm.

By an opaque mirror layer is meant a metal layer with a reflectivity of at least 60%, preferably more than 70% and particularly preferably more than 80%. A transmission of the opaque metal layer of less than 10%, preferably less than 5%, is further preferred.

Furthermore it is preferred if the opaque mirror layer is generated by vacuum deposition of Al, Cr, Ag, Cu, or alloys with these metals such as e.g. $Al_{96}\%$ $Cu_4\%$, in particular with a layer thickness of from 15 nm to 100 nm, preferably from 20 nm to 60 nm.

The first metal layer and/or the second metal layer is expediently generated by vacuum coating or sputtering. A constant layer thickness and a good optical quality of the respective layer can hereby be ensured.

It is preferred if the first metal layer and/or the second metal layer is partially demetalized, in particular by etching and/or lift-off. In the case of structuring by etching, after application of the respective metal layer an etch resist is printed onto the metal layer and in the areas not covered by the etch resist the metal layer is removed by an etchant, for example a lye. The etch resist can then be removed, but it can also remain in the multilayer body and perform additional decorative functions, for example if it is a colored or pigmented resist varnish.

The first metal layer and/or the second metal layer is preferably demetalized such that a demetalized area of the metal layer and/or of the second metal layer forms a symbol, image, logo, alphanumeric character or a combination thereof.

Additional items of optical information or designs can hereby be introduced into the multilayer body.

It is further preferred if the first metal layer and the second metal layer are demetalized such that the demetalized areas overlap in the viewing direction onto the surface normal of the plane spanned by the multilayer body. Translucent designs can hereby be implemented. A security element designed in this way allows the substrate of the security document to be seen in the overlapping demetalized areas, e.g. the printed banknote substrate or also a window element in the substrate.

It is furthermore expedient if the first metal layer and the second metal layer are demetalized such that a metalized area of one of the metal layers overlaps the outer contour of a demetalized area of the respectively other metal layer.

Positioning or registration errors of the outer contour can hereby be at least partially covered by the respectively other metal layer, with the result that an appealing design that appears register-accurate results without a high outlay on positioning. By register accuracy or registration accuracy is meant a relative positional accuracy between two elements, e.g. areas or layers relative to each other. This positional accuracy can be set by means of so-called register marks or registration marks, which are specifically formed such that the respective tolerance of the positional accuracy can in particular be read optically particularly well or detected by machine. These register marks or registration marks can represent separate elements, which are arranged, for example, in an edge area. These register marks or registration marks can, however, also represent integral components of the multilayer body which make it possible to optically detect clearly, e.g., characteristic contours of a motif or structures of the motif or structures of the surface relief or similar.

It is advantageous if the surface relief and the further surface relief at the two boundary surfaces of the spacer layer at least partially correlate.

By an at least partial correlation of the reliefs is meant that the reliefs are similar, but not identical, and in particular can be transferred into each other through an imaging function, for example a compression. In the simplest case the surface reliefs thus have the same structure, but different relief depths. The peaks or troughs of the relief structures further preferably lie on top of each other in each case, i.e. the peaks of the surface relief in the boundary surface between the replication layer and the first metal layer, seen vertically, lie on top of the peaks of the surface relief in the boundary surface between the spacer layer and the second metal layer.

As explained at the beginning, however, structural differences are also possible, such as for example a rounding off of a blazed grating into a more sinusoidal cross-sectional structure. As already stated, the desired properties of the multilayer body are made possible precisely through this partial correlation, with the result that color progressions or color-to-gray gradients are made possible in the appearance of the multilayer body.

It is particularly advantageous if a structure depth of the further surface relief is at most 90%, preferably 80%, further preferably at most 50%, of a structure depth of the surface relief.

If the structure depth of the further surface relief is more than 50% of the structure depth of the surface relief, a color-to-gray gradient appears in the appearance of the multilayer body, otherwise a progression between two colors results.

The structure depth of the surface relief can lie between 200 nm and 20 μm. The structure depth of the surface relief is preferably 200 nm to 2000 nm, preferably 300 nm to 1500 nm. These depth ranges are particularly suitable, in combination with the preferred values for the average dry layer thickness of the spacer layer described below, for achieving the desired optical effects.

It is furthermore preferred if the spacer layer has an average dry layer thickness of from 200 nm to 800 nm, preferably from 300 nm to 700 nm, wherein the dry layer thickness can be variable in the lateral direction.

The local dry layer thickness d, together with the refractive index n of the spacer layer as well as the observation angle α, determines the resulting color impression. With a refractive index of 1.5 and an observation angle of 30°, for example a red color impression results if the dry layer thickness is 425 nm, a green color impression results if the thickness is 350 nm and a blue color impression results if the thickness is 300 nm.

It is further preferred if the spacer layer has a refractive index of from 1.35 to 1.65, preferably of approximately 1.5. As already explained, the color impression of the multilayer body can be set through the interplay of refractive index and dry layer thickness.

The surface relief advantageously has microstructures with a depth-to-width ratio of less than 0.5, preferably of less than 0.4. The microstructures can be refractive—e.g. micromirrors—or diffractive—e.g. Fresnel-type diffraction gratings—microstructures. By width of the microstructures is meant here the distance from peak to peak or the period of the micromirrors or the diffractive microstructures.

The surface relief in the form of a free-form surface is preferably formed as a diffractive free-form element with a grating structure.

It is advantageous if the grating structure comprises grating lines substantially following the outlines of the free-form surface, wherein the distance between the grating lines and/or the grating depth changes over the grating structure and in particular changes continuously from the central area of the free-form surface out towards its edge. The period—i.e. the distance between the grating lines—and/or the depth of the surface relief varies in order to represent the desired free-form surface. Therefore it is further preferred if the depth-to-width ratio in at least 80% of the surface area of the free-form surface is less than 0.3. The grating lines can, but do not have to, continuously follow the outlines of the free-form surface. They can also be interrupted, in particular interrupted with a random pattern, e.g. in order to add a scattering action to the effect of the grating structure. This can increase the observation angle for the overall effect. The grating structure can also be alternatively or additionally superimposed with a structure scattering in a mat way. Both interrupted grating lines and the superimposition with a structure scattering in a mat way can lead to a more achromatic appearance of the grating structure—not of the thin-film system.

Through such a combination of a free-form surface with a grating structure, a diffractive lens effect can be achieved which gives the multilayer body the desired appearance. A special feature of the diffractive free-form elements formed by grating structures is to be seen in the fact that such diffractive lens structures—unlike refractive lenses—generate a different visual impression depending on the light wavelength used for the illumination or observation of the object in each case, whereby in turn particular design or security effects can be achieved.

It is preferred if a period of the grating lines at least in a partial area of the grating structure is smaller than 50 µm, preferably smaller than 30 µm, particularly preferably smaller than 15 µm.

The local dry layer thickness can be influenced in particular by a variation of the period. In the case of a varnish system which leads to a decoupling of the boundary surfaces—thus of the two surface reliefs—a further effect can also occur in addition to the shape change or shape leveling. Presumably, during the drying process of the wet-chemically applied spacer layer, capillary forces which originate from the grating grooves of the surface relief push material of the spacer layer in the direction of a larger period of the structures—typically in the direction of the center of the surface relief. The dry layer thickness is thereby greater in the center, or in areas with a coarse period $\Delta x$, than at the edge, or in areas with a smaller period $\Delta x$ of the relief structures. The resulting color gradient is continuous and perfectly registered relative to the shape of the surface relief. The area with the second color typically starts when the period of the microstructures is ≤30 µm, preferably ≤20 µm, in particular ≤15 µm.

It is further preferred if the substrate film consists of a flexible plastic film. For example, the substrate film consists of PET, PEN, MOPP, PP, PA, PC, COC or PVC.

The substrate film expediently has a layer thickness of from 4 µm to 500 µm, preferably from 8 µm to 150 µm and particularly preferably from 12 µm to 50 µm.

It is further advantageous if the multilayer body has at least one further translucent varnish layer, which is dyed by means of at least one dye and/or pigment. The at least one dye is preferably a soluble dye or luminescent substance. Dyes from the following substance groups are preferably used: metal complex dyes, in particular with $Cr^{3+}$ or $Co^{2+}$ as the central atom. Examples are the Neozapon dyes from BASF and Orasol dyes from BASF (formerly CIBA).

Further color effects can hereby be achieved, or the color effects of the thin-film system can be filtered and modulated. For example, a red color impression of the thin-film system can be modulated to an orange color impression through a translucent varnish layer dyed yellow.

It is expedient in particular if the at least one further varnish layer is arranged between the replication layer and the substrate film.

Additionally or alternatively, the replication layer can also be dyed by means of a dye and/or pigment, in order also to generate the named color effects.

Additionally or alternatively, the surface relief in the form of a free-form surface can also be combined with structures generating other effects. For example, the surface relief can also be gridded with a 2D, or 2D/3D or 3D hologram, in particular combined in an interlaced arrangement, which represents a number floating over the free-form surface. The proportion of surface area of the structures generating other effects is preferably small, in order to influence the color effect of the surface relief in the form of a free-form surface in combination with the thin-film setup as little as possible.

The proportion of surface area is preferably less than 30%, particularly preferably less than 20% and in particular preferably ≤10%.

The multilayer body can be implemented as a transfer film or as a laminating film. In the case of a transfer film the substrate film is joined to the remaining layers of the multilayer body, which form a transfer ply, by means of a detachment layer. In the case of the application of the multilayer body to a substrate, the multilayer body is secured, in particular glued, to the substrate and then the substrate film is peeled off the applied transfer ply. The application to the substrate can be effected, for example, by means of hot embossing or by means of cold embossing. In the case of a laminating film, the substrate film also remains on the multilayer body after the application of the multilayer body to a substrate.

BRIEF DESCRIPTION OF THE DRAWINGS

The invention and embodiments thereof are explained in more detail below with reference to the drawing. There are shown in.

DETAILED DESCRIPTION OF THE PREFERRED EMBODIMENTS

Figure 1:
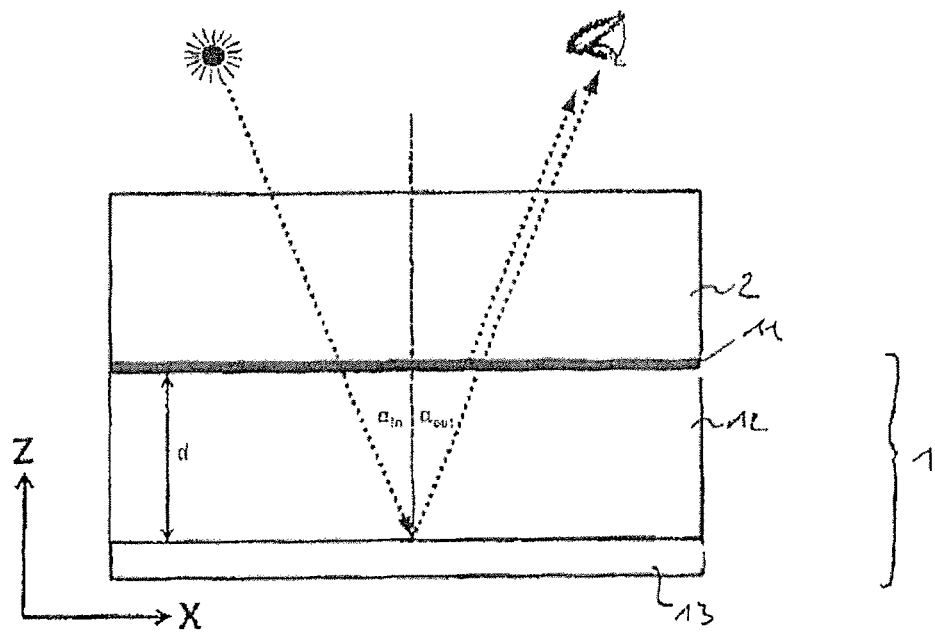
FIG. 1 a schematic illustration of the mode of operation of a Fabry-Perot thin-film system according to the state of the art.

A Fabry-Pérot thin-film system 1 represented schematically in FIG. 1 consists of a semi-transparent layer 11, usually a first metal layer (e.g. Cr, Al, Cu, Ti, Ag, Ni or Inconel), a transparent spacer layer 12 (e.g. $MgF_2$, $SiO_2$ or a polymer varnish) as well as a second metal layer 13. The latter likewise usually consists of metal (e.g. Al, Cr, Ag, Cu). It can be opaque or also semi-transparent. The layers 11, 12, 13 are deposited onto a substrate film 2. The sequence of the layers 11, 12 and 13 can also be reversed and the effect can be visible from the back, e.g. through a window of a security document.

Part of the light incident at the angle $\alpha_{in}$ is reflected on the semi-transparent first metal layer 11, part is absorbed and part is transmitted. The transmitted part penetrates the transparent spacer layer 12 and is reflected on the second metal layer 13. The reflected part of the light again penetrates the transparent spacer layer 12 and is partially transmitted through the semi-transparent layer 11. This transmitted part interferes with the portion of the light reflected on the semi-transparent layer 11 and reaches the eye of the observer at the angle $\alpha_{out}$, wherein $\alpha_{in}=\alpha_{out}=\alpha$. Light refraction was disregarded in this schematic representation. Because of the interference of the light portions, the light appears colored to the observer. The color impression here depends among other things on the thickness d as well as on the refractive index n of the spacer layer 12 and the angle $\alpha$. Constructive interference occurs when the optical path difference $\Delta$ between the portion of the light reflected on the first metal layer 11 and the portion of the light reflected on the second metal layer 13 is a multiple of the wavelength $\lambda$.

There are various coating methods which can be used to produce such a layer system 1. The two metal layers 11, 13 are usually applied using vacuum technology, e.g. by means of evaporation or sputtering. In contrast, the transparent spacer layer 12 can on the one hand be applied using vacuum technology, e.g. by means of thermal evaporation of $MgF_2$. On the other hand, such transparent layers 12 can also be produced wet-chemically, e.g. by means of gravure printing or slot coating.

These different production methods lead to very similar results on smooth substrates 2; a surface with a homogeneous color tilt effect or color change effect is achieved. On structured surfaces, in contrast, wet-chemically applied transparent spacer layers 12 result in clearly different layer patterns from spacer layers 12 applied using vacuum technology. This is due to the fact, among other things, that layers applied using vacuum technology are built up piece by piece, while wet-chemically applied layers are usually applied all at once and the liquid layer only cures in the drying and/or curing process, e.g. UV curing.

Figure 2:
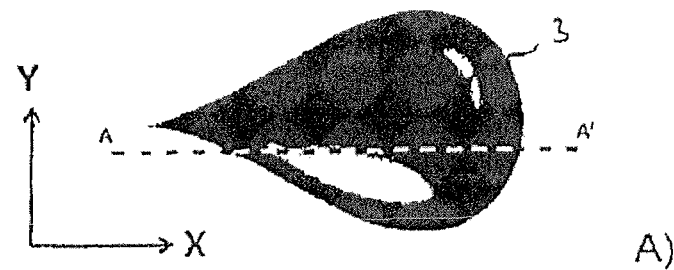
FIG. 2 a schematic representation of a three-dimensional free-form surface in top view and in cross section.
Figure 2:

Consequently, such thin-film systems 1 can be applied not only to the smooth surfaces shown in FIG. 1, but also to structured surfaces. An example of this is shown in FIG. 2. Surface relief structures 3 generate a three-dimensional surface which seems to protrude from the substrate plane. The shape of this 3D surface can be chosen almost randomly (free-form). In FIG. 2 the surface structure 3 imitates a droplet with an optically three-dimensional effect as a free-form surface. The structures are a special variant of Fresnel lenses. FIG. 2a shows a schematic top view of such a surface relief 3, which imitates the 3D droplet. An exemplary section through this three-dimensional shape is indicated with A-A'.

FIG. 2b shows a schematic side view along the section A-A' through this three-dimensional shape, wherein here the height profile 31 seemingly generated (not really present) is represented in the z' direction.

Figure 3:
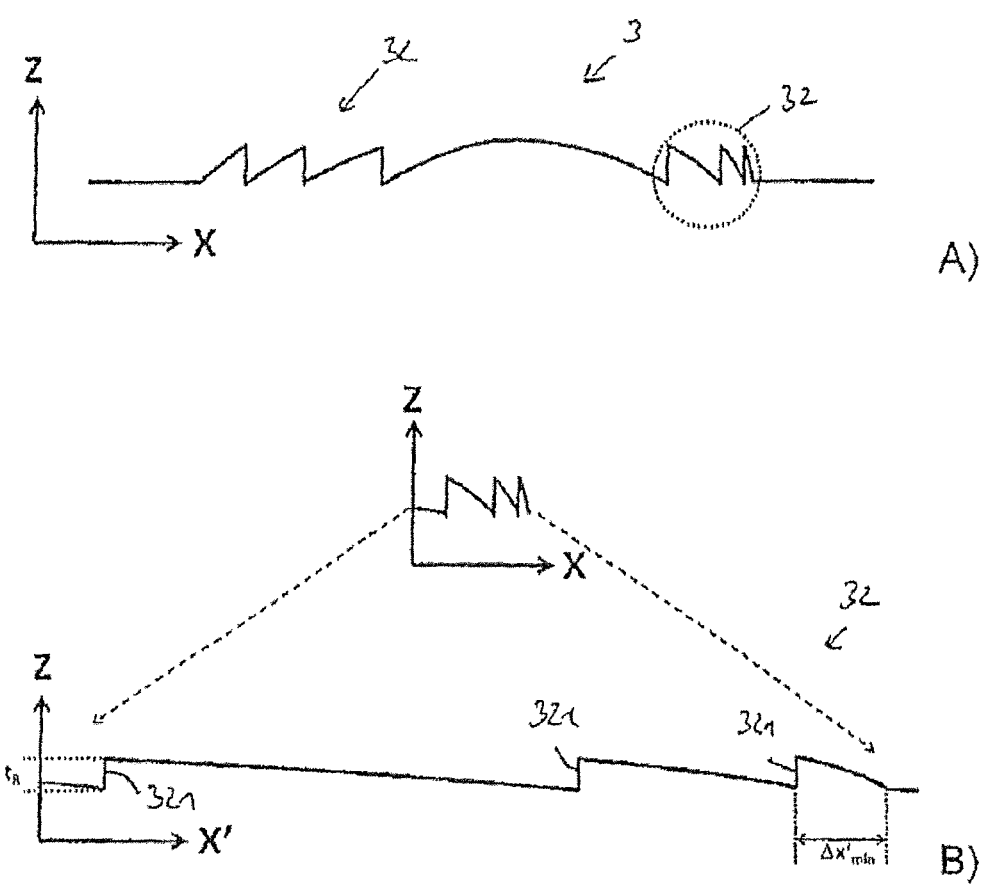
FIG. 3 a schematic detail view of a surface relief which optically imitates the three-dimensional free-form surface shown in FIG. 2 as well as an enlarged section of the surface relief.

Such a three-dimensional surface shape or an apparent height profile 31 can be optically generated by Fresnel lens-type microstructures 32. FIG. 3a shows a schematic side view (not to scale) of exemplary Fresnel-type relief structures 32 which optically generate the three-dimensional droplet shape from FIG. 2. For simplification, only a few grooves of the Fresnel lens are represented. If the representation were to scale, many more would have to be represented. Furthermore, to simplify the representation, the z-scale is reproduced greatly extended. In addition to the continuous Fresnel structures represented, so-called binary Fresnel structures can also generate a similar effect. In other words, the comparatively strongly 3D domed impression from FIGS. 2a, 2b can be simulated with special diffractive structures the extent of which in the z direction can be significantly smaller than simulated by the achieved optical effect.

FIG. 3b shows the area marked by a dotted circle in FIG. 3a enlarged and represented approximately to scale. In the currently used hot-embossing films, the smallest period or structure width $\Delta x'_{min}$ of the surface relief structures 32 is approx. 3 µm and thus is approximately two to three times larger than the depth $t_R$. The average depth-to-width ratio of the structure elements is consequently smaller than 0.5. Here the depth of the structures $t_R$ typically lies in the range from 500 nm to 1500 nm. The angles of the edges 321 of the relief structures 32 in reality are consequently much less acute than FIG. 3a shows.

Figure 4:
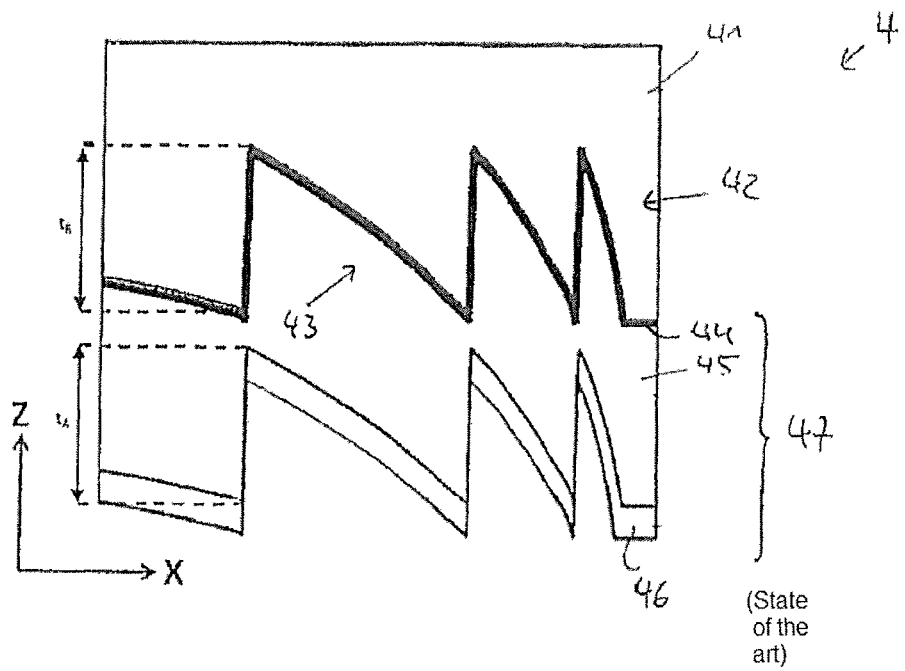
FIG. 4 a schematic sectional representation through a multilayer body with a surface relief and a thin-film system according to the state of the art.

A schematic cross section, not to scale, through a multilayer body 4 known from the state of the art is shown in FIG. 4. This comprises a substrate film 41 with a replication layer 42, into which a surface relief 43 is introduced. To this, in each case using vacuum technology, a semi-transparent first metal layer 44, a transparent spacer layer 45 and a second metal layer 46 are applied, which form a thin-film system 47 of the described type. The replicated surface relief 43 reproduces itself recognizably in the further layers. It is to be recognized that the replicated structures are present almost identically in the second boundary surface of the transparent spacer layer 45—thus the boundary surface between the spacer layer 45 and the second metal layer 46. This is the case with spacer layers 45 applied purely using vacuum technology, as here these layers are built up piece by piece. The structure depth $t_A$ on the side of the spacer layer 45 opposite the replication varnish usually lies—in the case of the typical layer thicknesses of the spacer layer 45 applied using vacuum technology—in the range from 90% to 100% of the original depth in the replication varnish $t_R$. The peaks of the structures here can, however, also be present slightly rounded.

When observed perpendicularly or at relatively acute observation angles α of from approx. 0° to 20°, the color effect of such a security feature—consisting of the relief structures 43 of the replication layer 42, coated with the thin-film system 47—displays almost the same color impression over the entire area of the relief structures, as the layer thickness overall is almost identical. The thin-film filter thus acts as in a flat—i.e. unstructured—area.

Figure 5:
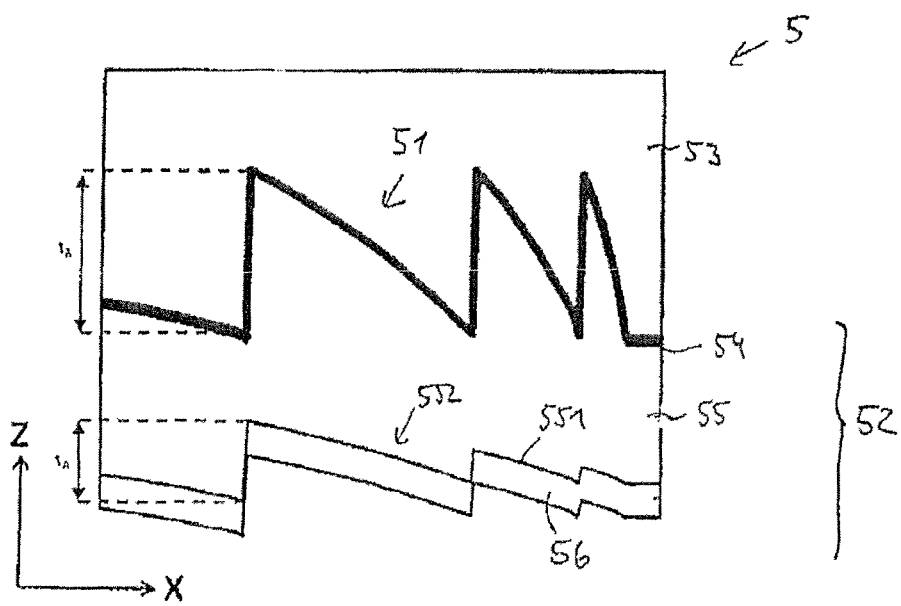
FIG. 5 a schematic sectional representation through an embodiment example of a multilayer body with a surface relief and a thin-film system with a wet-chemically deposited spacer layer.

FIG. 5 shows, not to scale, an embodiment example of a multilayer body 5 which combines a surface relief 51 with a thin-film system 52. The multilayer body 5 comprises a substrate film 53, which preferably consists of PET, PEN, MOPP, PP, PA, PC, COC or PVC and has a layer thickness of from 4 μm to 500 μm, preferably from 8 μm to 150 μm and particularly preferably from 12 μm to 50 μm.

A surface relief 51 is introduced into the substrate film 53 or into a replication layer applied to the substrate film 53. This is preferably formed as a diffractive free-form element with a grating structure.

It is advantageous if the grating structure comprises grating lines substantially following the outlines of the free-form surface, wherein the distance between the grating lines and/or the depths of the grating structure changes over the grating structure and in particular changes continuously from the central area of the free-form surface out towards its edge.

Through such a combination of a free-form surface with a grating structure, a diffractive lens effect can be achieved which gives the multilayer body the desired appearance.

It is preferred if a period of the grating lines at least in a partial area of the grating structure is smaller than 50 μm, preferably smaller than 30 μm, particularly preferably smaller than 15 μm.

A semi-transparent metal layer 54 is applied to the surface relief 51, preferably by vacuum coating, sputtering or the like. It is preferred if the metal layer consists of Cr, Al, Cu, Ti, Ni, Ag or Inconel and has a layer thickness of from 2 nm to 20 nm, preferably from 4 nm to 15 nm.

A transparent spacer layer 55 is applied to the side of the metal layer 54 facing away from the surface relief 51 wet-chemically, in particular by means of gravure printing, curtain coating, slot coating or the like.

The spacer layer 55 is preferably generated by application of a varnish, in particular based on nitrocellulose, epoxy, polyester, rosin, acrylate, alkyd, melamine, PVA, PVC, isocyanate or urethane systems, in order thus to generate the desired optical properties.

The varnish can contain further additives, such as e.g. crosslinkers or surfactants, in order to set its physicochemical properties, such as for example the viscosity or polarity, to desired and advantageous values.

It is furthermore expedient if, for application of the spacer layer, a varnish with a viscosity of from 5 mPa·s to 250 mPa·s, preferably from 15 mPa·s to 200 mPa·s and particularly preferably between 20 mPa·s and 170 mPa·s is used. With respect to the polarity of the varnish, it is advantageous if the solvents of the varnish consist of solvent with a polarity index greater than 3.0 at a rate of at least 30% by mass, preferably of solvent with a polarity index greater than 3.0 at a rate of at least 50% by mass. The polarity index here is understood as in Table 2 of EP 2264491 A1.

The surface relief 51 of the substrate film 53 reproduces itself on the side of the spacer layer 55 facing away from the surface relief 51. The wet-chemical coating parameters, in particular the viscosity and polarity of the varnish system used, but also the varnish system used and/or the solvent or solvents, can influence how strongly the surface relief 51 reproduces itself in the surface 551 of the spacer layer 55.

The spacer layer 55 is preferably applied with a wet layer thickness of from 1 μm to 20 μm, preferably from 2 μm to 10 μm. Both the wet and the dry layer thicknesses also influence the resulting structure depth of the relief 552 forming in the side of the spacer layer 55 facing away from the replication layer 53 and thus the optical properties of the resulting thin-film system 52.

After the wet-chemical deposition, the spacer layer 55 is dried, in particular at a temperature of from 40° C. to 200° C., preferably from 40° C. to 150° C. There is preferably a temperature gradient in the dryer of the printing machine, wherein the temperature is between 40° C. and 60° C. at the start of the dryer and increases to 100° C. to 150° C. at the end of the dryer. This results in a controlled average dry layer thickness of from 200 nm to 800 nm, preferably from 300 nm to 700 nm, with the desired degree of correlation between the two surface reliefs 51, 552.

Finally, a second metal layer 56, preferably made of Al, Cr, Ag or Cu with a preferred layer thickness of from 15 nm to 100 nm, particularly preferably from 20 nm to 60 nm, is also deposited onto the side of the spacer layer 55 facing away from the metal layer 54.

Because of the wet-chemical deposition, the structure depth $t_A$ of the surface relief 552 reproduced in the spacer layer 55 decreases appreciably compared with the structure depth $t_R$ of the surface relief 52 in the substrate 53, i.e. $t_A \leq 80\% \; t_R$. How strongly relaxed, i.e. weakened, the structures in the second boundary surface are depends, among other things, on the wet-chemical coating parameters, in particular the material base, the viscosity and the polarity of the varnish system used, but also the solvents used. The wet and the dry layer thicknesses also have a significant influence.

Figure 6:
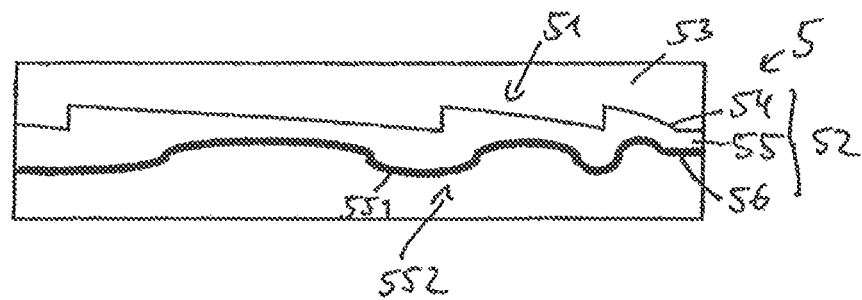
FIG. 6 a schematic sectional representation through a further embodiment example of a multilayer body with a surface relief and a thin-film system with a wet-chemically deposited spacer layer.

Measurements have shown that not only does the structure depth in the relief 552 of the spacer layer 55 decrease, but the shape of the structures can sometimes also change. Micrographs thus show that, for example, a blazed shape of Fresnel structures present at the first boundary surface—thus between the semi-transparent metal layer 54 and the spacer layer 55—is present not only less deep, but rather also sinusoidal at the second boundary surface—thus between the spacer layer 55 and the second metal layer 56. This is represented schematically in FIG. 6.

Because of this shape leveling and/or the decreasing correlation between the two surface reliefs 51, 552, the thickness of the spacer layer can vary relatively greatly, which then leads to a substantial weakening of the color contrast. As the color impression is influenced directly by the layer thickness of the spacer layer 55, such a relatively greatly varying layer thickness results in a greatly varying color impression in a lateral extent in the size of the grating period and thus below the resolution limit of the human eye.

For example, at an observation angle of 30°, a layer thickness of the printed spacer layer 55 (refractive index n=1.5) of 425 nm yields a red color impression, a thickness of 350 nm yields a green color impression and a thickness of 300 nm yields a blue color impression. The mixed color of such a spacer layer 55 with a layer thickness varying greatly below the resolution limit of the human eye therefore usually appears dark gray or metallic gray to the human eye. The greatly varying layer thickness of the spacer layer 55 is mainly present with a fine grating period in areas of the relief structure 51, 552. In this case there is a gradient from color in areas with a coarse period of the relief structure towards gray/achromatic in areas with a fine period of the relief structure. As the gradient is generated by the structures of the surface relief 51, the color-to-gray gradient is perfectly registered relative to the 3D impression or the three-dimensional surface shape of the relief structures 51, 552.

The great variation of the layer thickness of the spacer layer 55 is mainly present in regions in which the period of the surface relief microstructures is small—i.e. ≤50 µm, preferably ≤30 µm, in particular ≤20 µm. The resulting variation of the layer thickness of the spacer layer 55 results in a color-to-gray gradient, wherein the area appearing gray typically starts when the period of the surface relief microstructures is ≤50 µm, preferably ≤30 µm, in particular ≤20 µm. The color-to-gray gradient optically clearly emphasizes the free-form surface.

The period of the microstructures is typically smaller towards the edge of the free-form, which is why the color-to-gray gradient usually runs from the center of the free-form to the edge.

Figure 7:
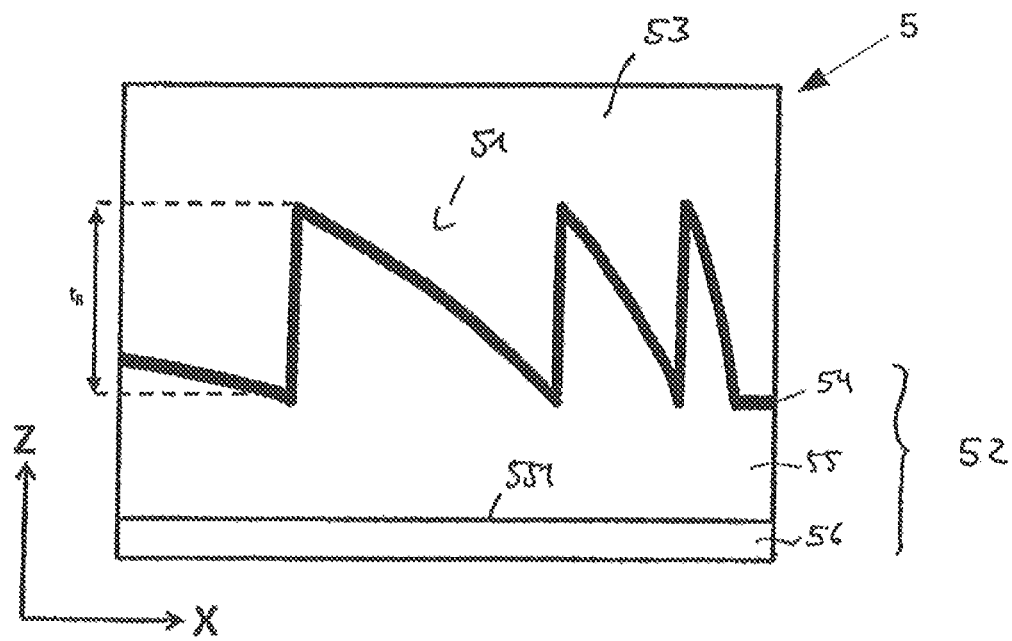
FIG. 7 a schematic sectional representation through a further embodiment example of a multilayer body with a surface relief and a thin-film system with a wet-chemically deposited spacer layer.
Figure 8:
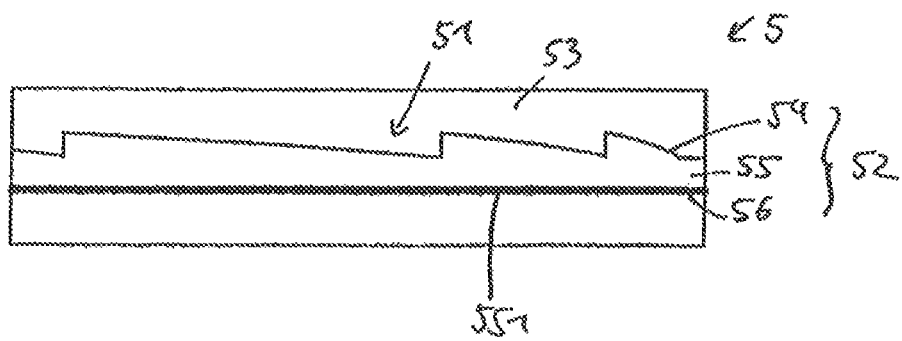
FIG. 8 a schematic sectional representation through a further embodiment example of a multilayer body with a surface relief and a thin-film system with a wet-chemically deposited spacer layer.

In addition to a color progression or color gradient from a first color to a gray or metallic impression, it is also possible to realize a progression from a first to a second color. For this it is preferred for the correlation of the two boundary surfaces of the spacer layer 55 to be very small, i.e. $t_A \leq 50\% \, t_R$ and in particular $t_A \leq 30\% \, t_R$. In the extreme case, the second boundary surface is even formed almost smooth towards the second metal layer, or the correlation between the surface reliefs 51, 552 is (almost) completely removed. This is an extreme form of the shape change or shape leveling. FIGS. 7 and 8 show this in schematic side views that are not to scale.

In particular in the case of a varnish system which leads to a decoupling of the boundary surfaces, a further effect can also occur in addition to the shape change or shape leveling. Presumably, during the drying process of the wet-chemically applied spacer layer 55, capillary forces which originate from the relief grooves push material of the spacer layer 55 in the direction of a larger period of the structures of the surface relief—i.e. typically in the direction of the center of the relief shape or the desired free-form surface. Furthermore, material of the spacer layer 55 is no doubt also pushed in the direction of mirror surfaces, surrounding the surface relief, or also surrounding surfaces with flatter other structures. Diffraction gratings with periods below 2 µm and grating depths below 200 nm are an example of these other structures. The layer thickness is thereby larger in the center of the free-form surface, or in areas with a coarse period $\Delta x$, as well as in the areas surrounding the surface relief than at the edge of the free-form surface, or in areas with a smaller period $\Delta x$ of the relief structures. In areas with a relatively large local period $\Delta x$ of the relief structures the layer thickness is almost identical to the thickness in areas without structures, i.e. on a smooth surface, or almost identical to the thickness in areas with flatter other structures. The color gradient is continuous and perfectly registered relative to the shape of the surface relief. The color gradient thereby optically clearly emphasizes the free-form surface. The area with the second color typically starts when the period of the surface relief microstructures is ≤30 µm, preferably ≤20 µm, in particular ≤15 µm.

Multilayer bodies in the manner of the invention, which have a gradient from a first color to a second color, could even have two different color effects in the area with the surface relief in the form of a free-form surface. Thus, for example in the area with a coarse period $\Delta x$, there can be a color effect from red in the case of almost perpendicular observation to green in the case of tilted observation (e.g. 30°). At the same time, in the area with a fine period $\Delta x$, there can be a color effect from green in the case of almost perpendicular observation to blue in the case of tilted observation (e.g. 30°).

As a whole, it is thus possible to realize both a color-to-gray and a color-to-color progression.

A color progression from a first color to a metallic/gray/achromatic impression occurs when the relaxation is less than 50%, i.e. when $t_A \geq 50\% \, t_R$. At the same time, however, $t_A$ must be ≤90% $t_R$ and preferably $t_A \leq 80\% \, t_R$. In other words, if the structure depth at the boundary surface between the spacer layer and the second metal layer lies between 50% and 90%, preferably 50% to 80%, of the structure depth at the boundary surface between the spacer layer and the first metal layer, a color/gray gradient results.

A color progression from a first to a second color occurs above all when the structure depth relaxes by more than 50%, i.e. when $t_A \leq 50\% \, t_R$. $t_A \leq 40\% \, t_R$ is preferred, $t_A \leq 30\% \, t_R$ is further preferred and $t_A \leq 20\% \, t_R$ is preferred in particular. In other words, if the structure depth at the boundary surface between the spacer layer and the second metal layer 55 is smaller than/equal to 50%, preferably smaller than/equal to 40%, particularly preferably smaller than/equal to 30% and in particular smaller than/equal to 20% of the structure depth at the boundary surface between the spacer layer and the first metal layer, a gradient between two colors results.

Figure 9:
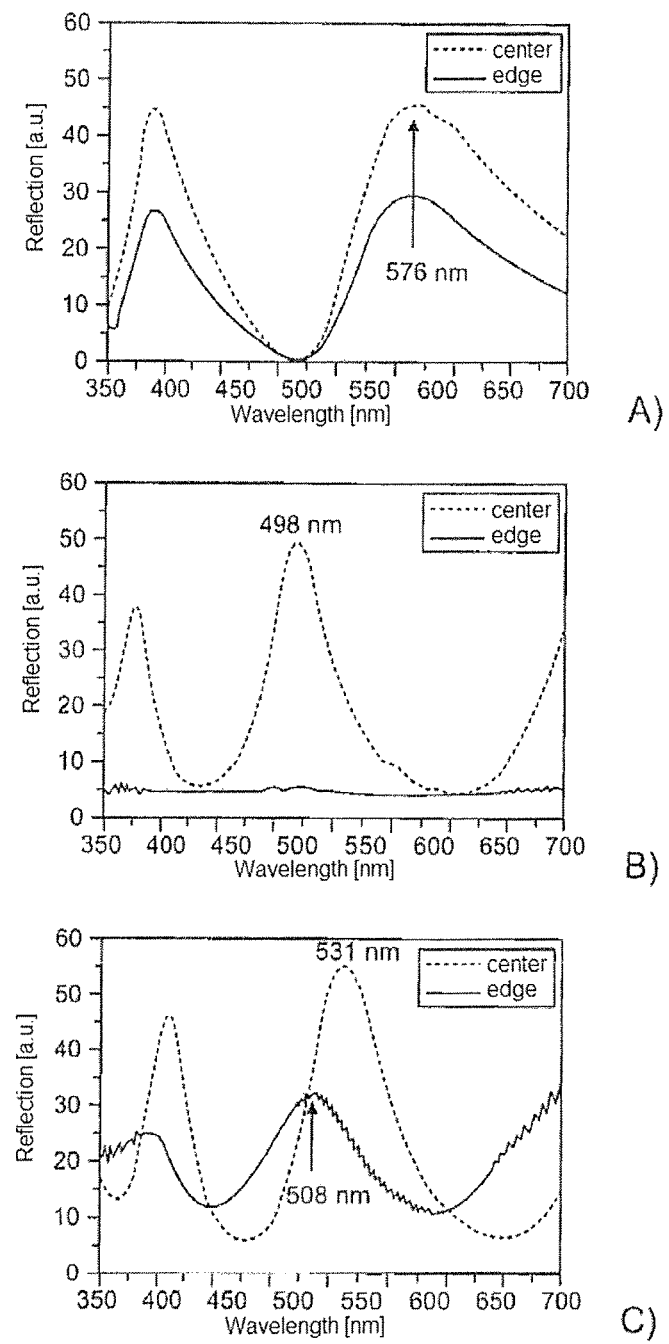
FIG. 9 reflection spectra of multilayer bodies with a surface relief and a thin-film system.

The described cases can be distinguished by means of spectrometer measurements. FIGS. 9A to 9C show examples of measured spectra in the case of perpendicular incidence—i.e. when $\alpha = 0°$—for the case shown in FIG. 4 of very strong correlation of the boundary surfaces in the case of a spacer layer applied using vacuum technology according to the state of the art (FIG. 9A), the case shown in FIG. 5 of weakened correlation of the surface reliefs in the case of wet-chemical deposition of the spacer layer (FIG. 9B) and the case shown in FIG. 7 of very low correlation of the surface reliefs in the case of likewise wet-chemical deposition of the spacer layer (FIG. 9C). One spectrum in the area with a coarse period of the surface relief (center, dashed-line graph) and one in the area with color gradient or in the area with a small period of the surface reliefs (edge, continuous-line graph) are shown in each case.

As shown in FIG. 9A, the spectra in the central and edge areas of the surface relief in the case of a vapor-deposited spacer layer substantially follow the same progression—i.e. the peak maxima and minima lie at the same wavelength. The thin-film system therefore appears monochromatic over the entire area of the free-form surface. The slightly reduced reflection in the edge area is due to the fact, among other things, that the surface relief diffracts part of the light more strongly out of the viewing direction of the spectrometer in the edge area than in the central area.

In FIG. 9B it is to be recognized that in the area of the surface relief 51 there is a gradient from a first color (center, dashed-line graph) to a gray/metallic impression (edge, continuous-line graph), wherein the difference $\Delta R$ between the maximum $R_{max}$ and the minimum $R_{min}$ of the reflection measured in the case of perpendicular incidence in the spectral range from 430 nm to 690 nm is at least 3×, preferably at least 5× and in particular preferably at least 7×, greater in the area of the first color than in the area with the gray/metallic impression.

In the case of FIG. 9C it is to be recognized that in the area of the surface relief 51 there is a gradient from a first (center, dashed-line graph) to a second color (edge, continuous-line graph), wherein the two reflection spectra, belonging to the colors and measured in the case of perpendicular incidence, exhibit a shift of the wavelength Δλ of at least one of the reflection peaks of at least 10 nm, preferably at least 20 nm and in particular at least 30 nm. This reflection peak here usually lies in the spectral range from 430 nm to 690 nm. In the measured example shown in FIG. 9c, the shift of the peak wavelength is Δλ=531 nm−508 nm=23 nm.

Instead of the Fabry-Pérot systems described up to now, other thin-film systems can also be used, e.g. HLH systems (HLH, LHL, HLHL, LHLH, etc.). A specific example of this is a vapor deposition of the replicated surface structure with a layer of high-refractive-index material (H, H for high refractive index), e.g. 80 nm $TiO_2$ with n≈2.54 at λ=589 nm, $ZrO_2$ or ZnS. A rather low-refractive-index spacer layer (L, L for low refractive index) with the thickness d is then applied wet-chemically, e.g. 500 nm PVC varnish with n=1.545 at λ=589 nm. This layer generates the optical path difference for the interference of the light portions. In this spacer layer the structures in the second boundary surface are again present relaxed, which leads to a gradient. As a third layer, again a layer of high-refractive-index material (H), e.g. 80 nm $TiO_2$, $ZrO_2$ or ZnS, is applied, e.g. vapor-deposited. The thickness of the high-refractive-index layers is preferably in the range from 10 nm to 200 nm and in particular between 20 nm and 100 nm. Such a thin-film system also generates, through interplay with the relief structures, a color impression with a color progression or color gradient. The advantage of such a thin-film system is that it is transparent, and thus can also be placed over vital, in particular personalized and/or individualized, data for example in ID documents.

The color progression of the multilayer bodies 5 described up to now can also be modified by means of color filters which, seen starting from the observer, are located above the thin-film stack. For example, in the layer stack, one or more layers can be dyed.

Figure 10:
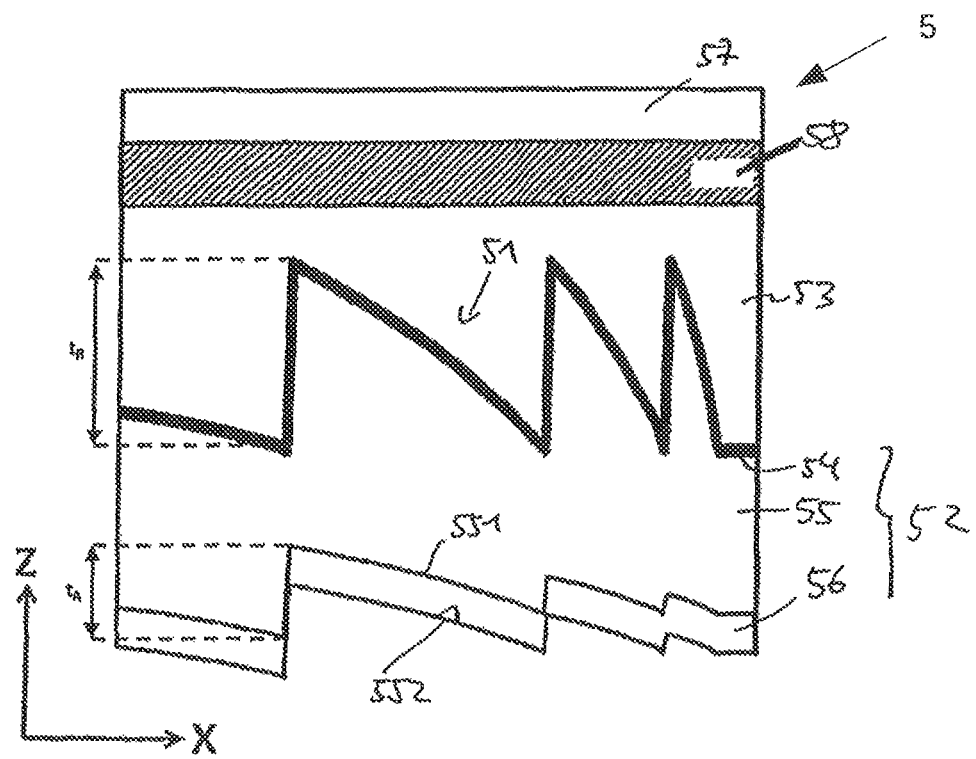
FIG. 10 a schematic sectional representation through a further embodiment example of a multilayer body with a surface relief, a color layer and a thin-film system with a wet-chemically deposited spacer layer.

FIG. 10 shows, in a schematic side view, the example of a dyed multilayer body 5. The layer structure corresponds to that shown in FIG. 5. An additional dyed varnish layer 58 with a preferred layer thickness of from 200 nm to 5 µm is provided between the replication layer 53 and the substrate film 57.

Alternatively, the surface relief structure 51 can, however, also be replicated into a dyed replication varnish 53. The color impression of the surface relief 51 in all of these cases is superimposed with the color impression of the color filter 58.

A specific example is a so-called gold foil, which has a replication varnish 53 indirectly or directly dyed yellow. In such a film, the background which is deep red for example at an observation angle of 30° as well as the deep red area of the surface relief would appear more orange. The chrome-metallic edge area of the surface relief on the other hand would have a dark yellow effect. The color gradient would therefore no longer be deep red to chrome-metallic, but orange to yellow.

Figure 11:
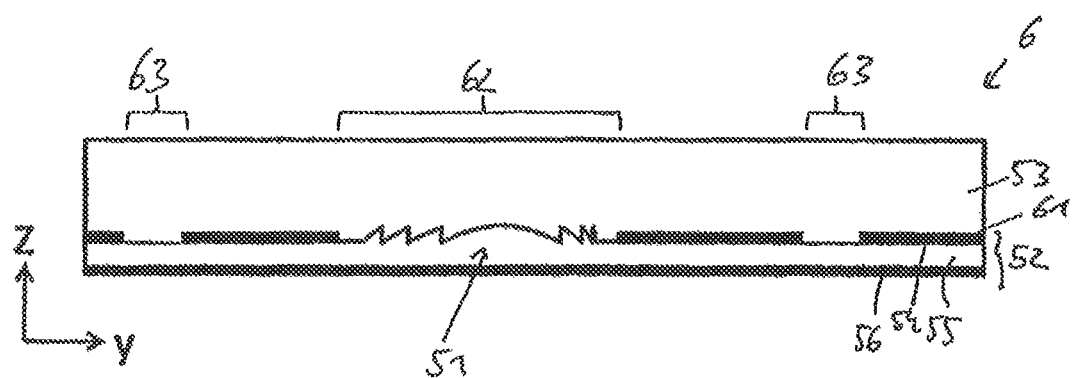
FIG. 11 a schematic sectional representation through a further embodiment example of a multilayer body with a surface relief, a partial metal layer and a thin-film system with a wet-chemically deposited spacer layer.

A specific example of the integration of the combination of surface relief 51 in the form of a free-form surface and thin-film system 52 in the manner of the invention into a security element 6 with a KINEGRAM® is represented in FIG. 11.

Here a KINEGRAM design is replicated and vapor-deposited over the whole surface with a first aluminum layer 61. Then, in a standard demetalizing process, in register, the aluminum is removed in the area 62 with the surface relief 51 as well as in the areas 63 where the thin-film effect is otherwise still to be seen. The thin-film system 52, which corresponds to the already described embodiment examples, is then applied to the back, seen from the observer, of the first aluminum layer 61.

Figure 12:
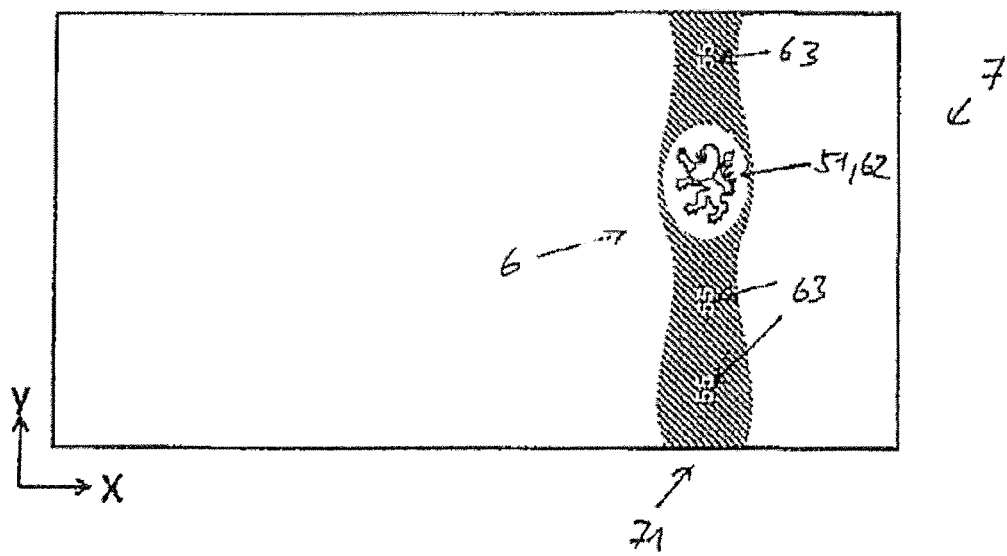
FIG. 12 a schematic view of a security document with a multilayer body according to FIG. 11.

FIG. 12 shows an exemplary model banknote 7 with such a demetalization design. A security strip 71 contains, among other things, a surface relief 51, which represents a free-form surface in the form of a lion and which has one of the described color gradients. This surface relief 51 is present in a demetalized area 62 of the strip. The rest of the strip has yet other effects, e.g. diffractive effects. Furthermore, the strip contains three demetalized areas 63 in the form of the number "55", wherein the Fabry-Perot three-layer system 52 is also present in these demetalized areas. The three numbers "55" consequently display the same or a very similar color tilt effect as is also present in the surface relief 51 in areas with a coarse period. Alternatively, the color effect in the areas 63 can be different from that in the area 62. For this, a different thickness of the spacer layer 55 must be present locally. In printing processes it is easily possible to generate locally different thicknesses in a targeted manner. This can be achieved, e.g., by different depths of the ink cells in a gravure printing roller in the areas of the roller which deposit the spacer layer onto the areas 62 and 63.

A further alternative provides that the metal layers of the thin-film system 52 are additionally removed in the areas 63 by means of one or more further demetalizing steps. This can be achieved, e.g., via a so-called lift-off process. In this case, a color effect is present in the area 62, whereas the substrate is to be seen undisturbed by metal layers in the areas 63.

Figure 13:
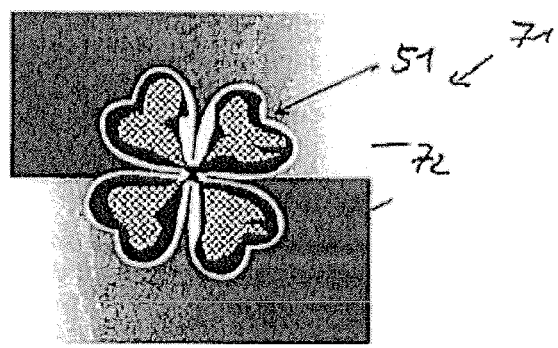
FIG. 13 a schematic view of a motif realized by means of a multilayer body according to FIG. 11.

FIG. 13 shows a schematic top view of such a security element 71 in detail. The color progression in the area of the surface relief 51 is illustrated by contour lines. The background for the motif formed by the surface relief 51 is formed by metalized surfaces 72.

The color effect of the surface relief 51 in the form of a free-form surface can, as previously described, be visible from the front of the substrate, i.e. from the side to which the multilayer body is applied. Alternatively, the layer structure can also be designed such that the color effect is to be seen through a window in the security document to which the multilayer body is applied. In other words, an observer sees the color effect of the surface relief when he observes the back of the security document. At the same time, the multilayer body can be designed such that the observer sees the surface relief 51 in the form of a free-form surface in a metallically reflecting and spatially mirrored form on the front of the security document. The mirroring here can be not only a left/right mirroring. The free-form surface can additionally also appear bulging out on one side of the security document and optically appear to be set back on the other side. This increases the memorability and thus the identification effect additionally.

Figure 14:
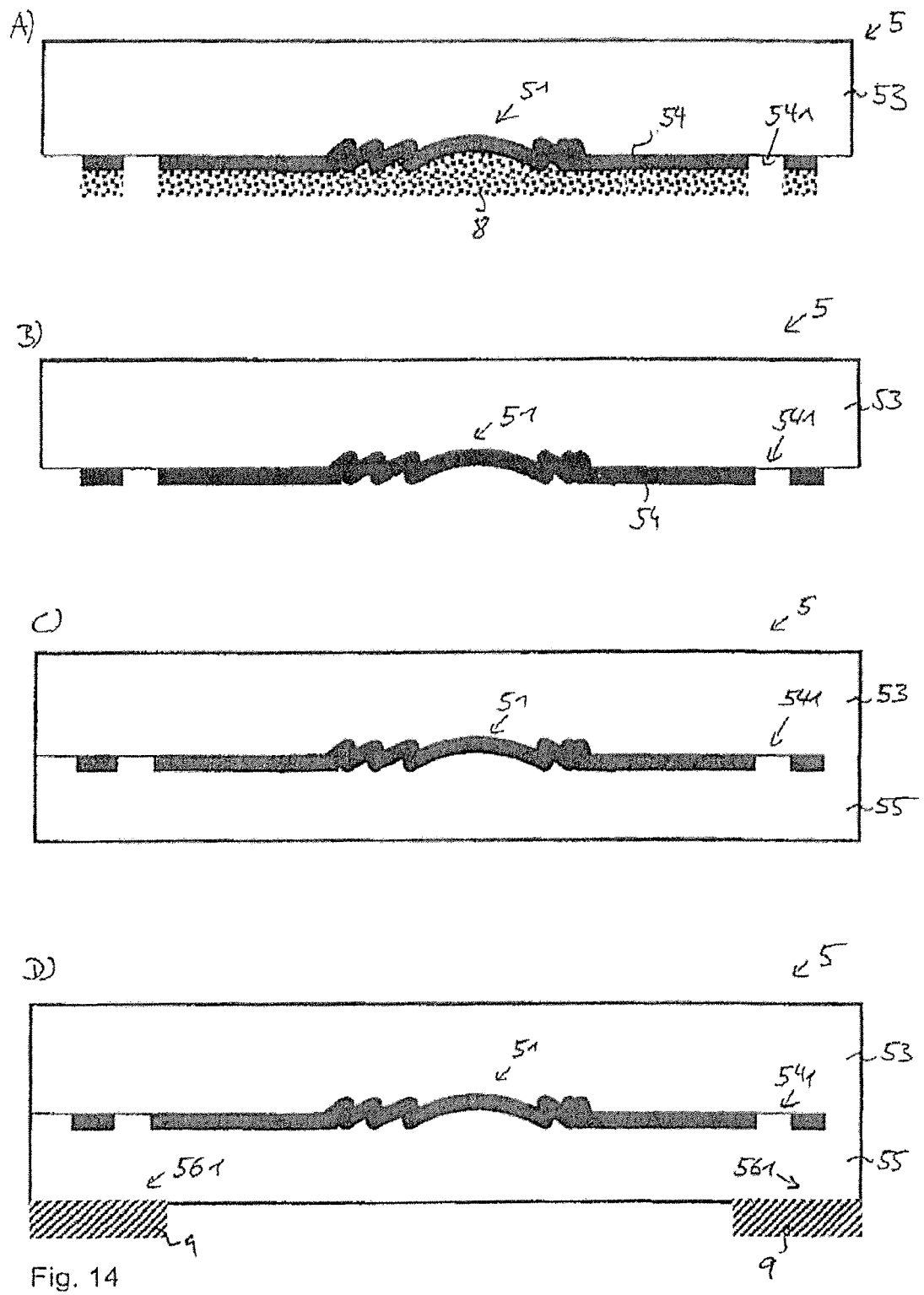
FIG. 14 a schematic representation of the method steps for producing an embodiment example of a multilayer body with partial demetalization.
Figure 14:
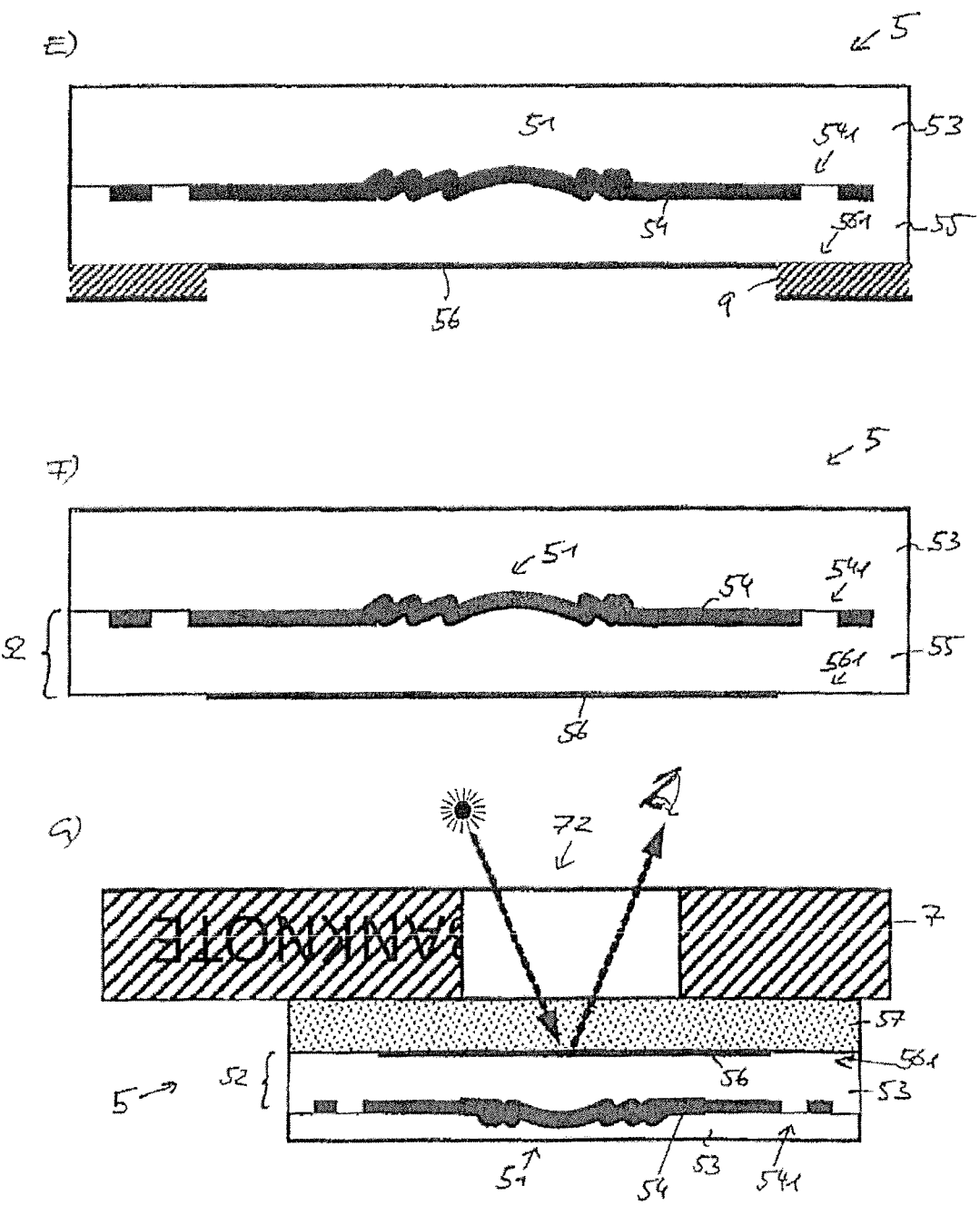

FIG. 14 shows an alternative method for producing a multilayer body 5 with partial demetalization of the metal layers 54, 56. A first metal layer 54, as already explained, is here also applied to the substrate film 53 with a surface relief 51 of the described type. In this embodiment example, the first metal layer 54 is formed as an opaque mirror layer. This is overprinted with an etch resist 8, which remains omitted in areas 541 to be demetalized. In these areas 541, the metal layer 54 can then be removed by etching (FIG. 14A).

After the etching, the etch resist 8 can be removed again by suitable solvents (FIG. 14B) and the uncovered metal layer 54 can be overprinted with the transparent spacer layer (FIG. 14C).

Before the deposition of the second metal layer 56, a lift-off varnish 9 is deposited onto the spacer layer 55 in those areas 561 in which the second metal layer 56 is to be removed later (FIG. 14D). The second metal layer 56 is then applied over the whole surface (FIG. 14E). In this example the second metal layer is formed semi-transparent. When the lift-off varnish 9 is removed by a suitable solvent, the second metal layer 56 is also removed with it in the areas 561 (FIG. 14F).

Demetalized areas 541 and 561 are thus obtained in the two metal layers, which overlap and which can form a motif. There is no thin-film effect in the demetalized areas 541 and 561.

Figure 15:
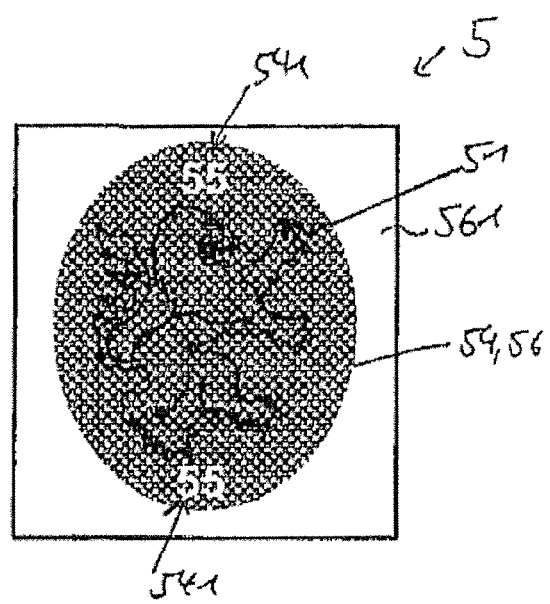
FIG. 15 a security element produced by means of a method according to FIG. 14 in front view.

If the multilayer body 5 is applied to a security document, for example a banknote 7 by means of a suitable adhesive layer 57 (FIG. 14G), the demetalized areas allow the substrate of the banknote to be viewed. The demetalized area 541 forms, as is to be recognized in FIG. 15, the number "55", while the demetalized area 561 frames the surface relief.

The area of the surface relief 51 is arranged over a window 72 of the banknote, with the result that the effect of the surface relief 51 with the color change effect generated by the thin-film system 52 is to be recognized from the other side of the banknote 7. The demetalized areas 541 and 561, in contrast, are concealed by the substrate of the banknote 7 in the case of observation through the window 72.

Figure 16:
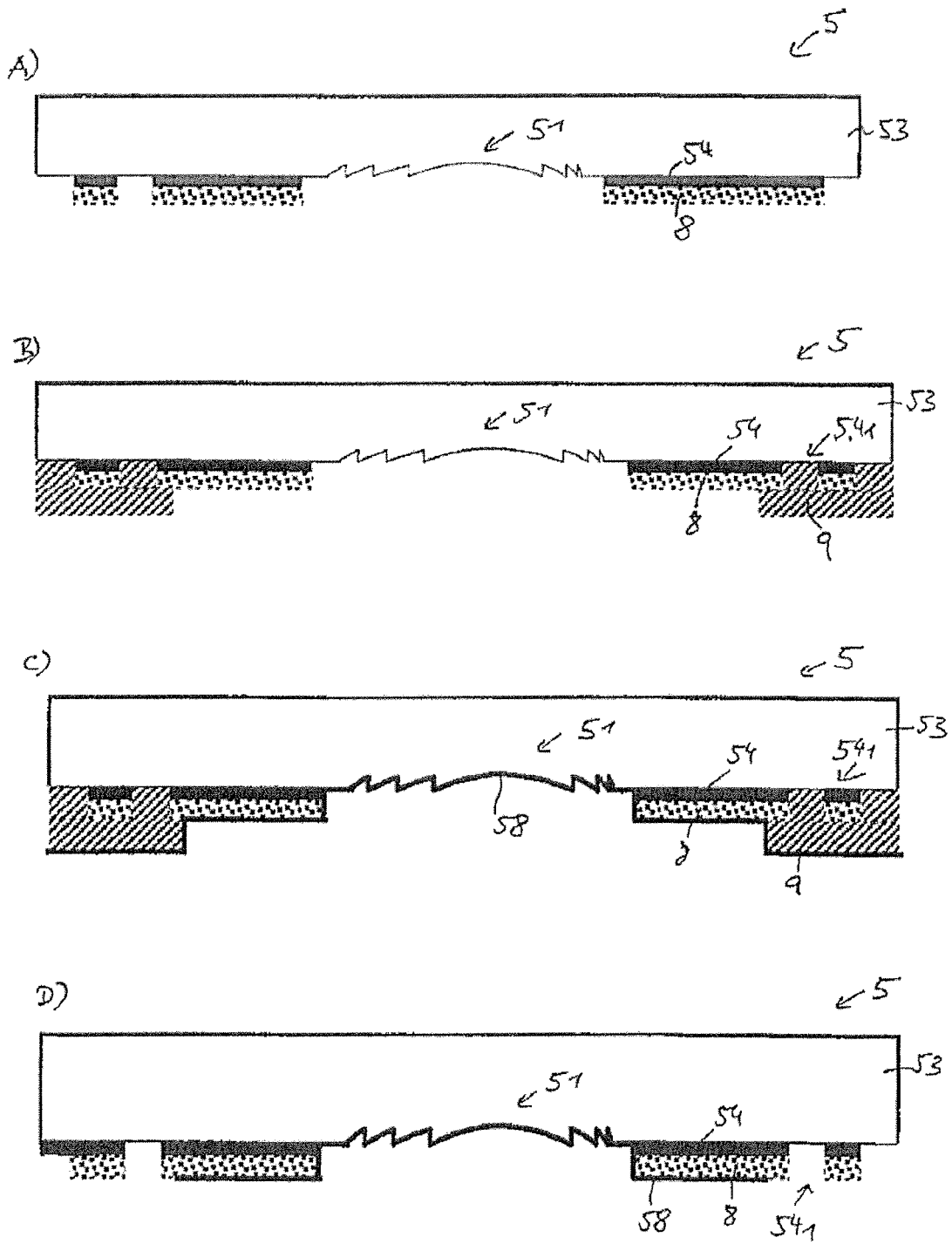
FIG. 16 a schematic representation of the method steps for producing an alternative embodiment example of a multilayer body with partial demetalization.
Figure 16:
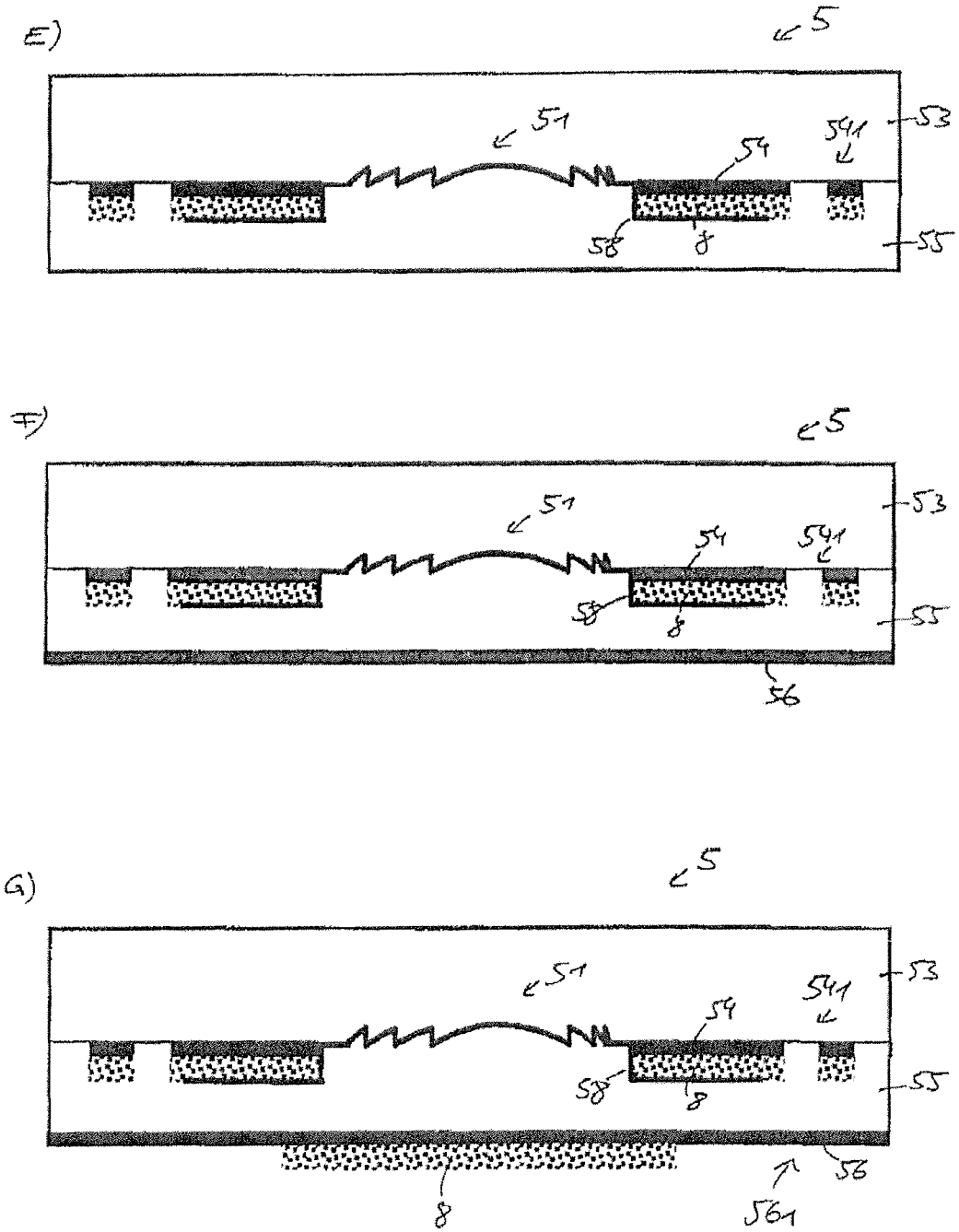
Figure 16:
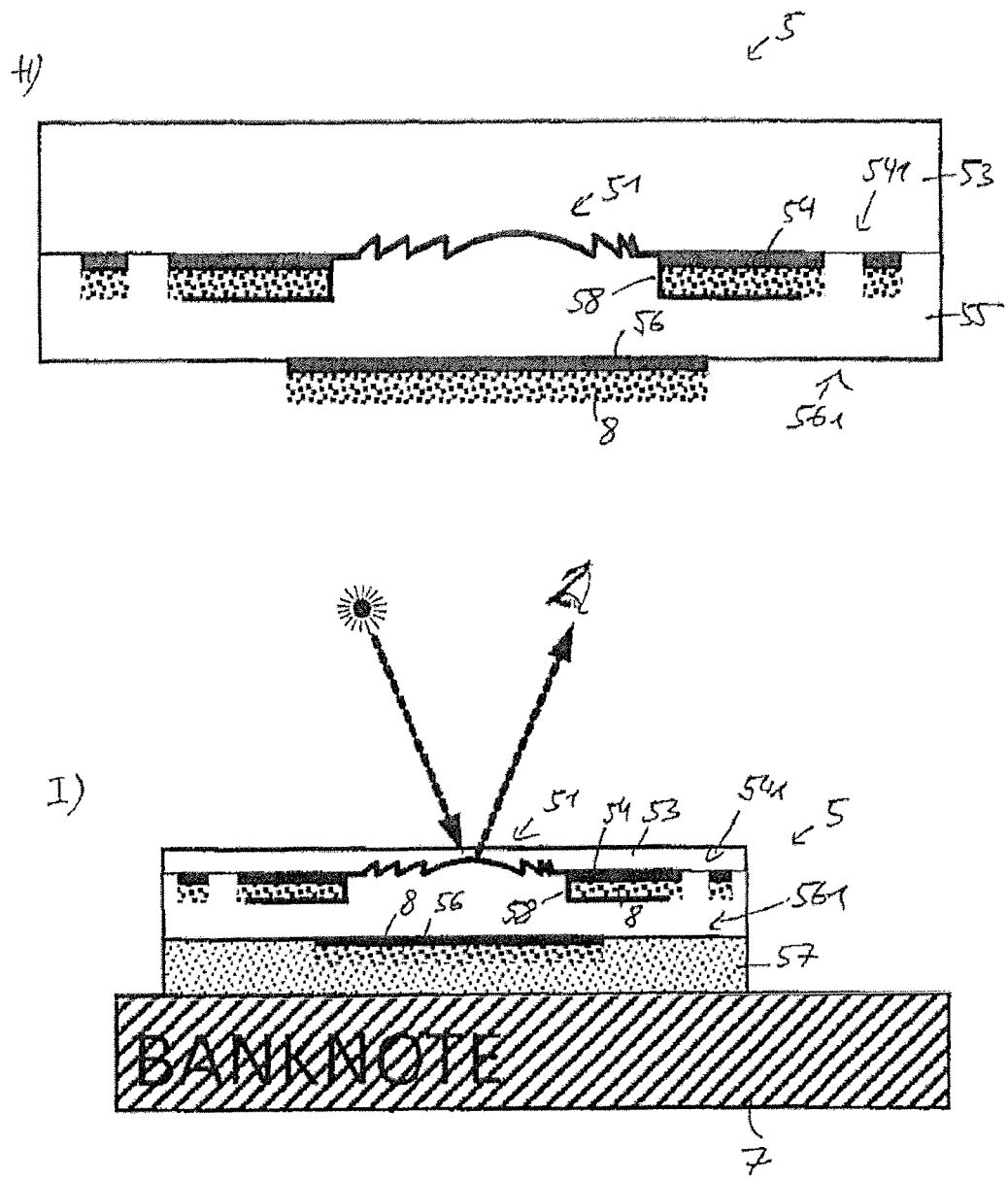

FIG. 16 shows a further alternative method for producing a multilayer body 5 with partial demetalization of the metal layers 54, 56. A first metal layer 54, as already explained, is here also applied to the substrate film 53 with a surface relief 51 of the described type. This is overprinted with an etch resist 8, which remains omitted in areas 541 to be demetalized. In these areas 541 the metal layer 54 can then be removed by etching (FIG. 16A). In addition the area of the surface relief 51 also initially remains left open here. In this embodiment the etch resist 8 is not removed and can take on additional decorative functions.

Now a lift-off varnish 9 is printed on in the areas 541 to be left open (FIG. 16B). Then a further, semi-transparent metal layer 58, preferably made of chromium, is vapor-deposited over the whole surface (FIG. 16C) and removed again by peeling off the lift-off varnish 9 in the areas 541 (FIG. 16D). The area of the surface relief 51 is thus now also metalized.

Analogously to the already described methods, the spacer layer 55 is now applied (FIG. 16E) and vapor-deposited over the whole surface with metal (FIG. 16F). An etch resist 8 is again partially printed onto the thus-generated second metal layer 56, which is opaque in this embodiment example, (FIG. 16G) and the metal layer 56 is removed in the left-open areas 561 by etching (FIG. 16H). Here too, the areas 541 and 561 again overlap.

Figure 17:
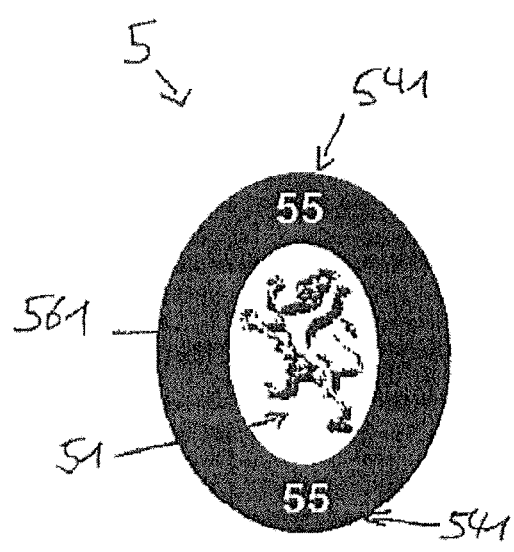
FIG. 17 a security element produced by means of a method according to FIG. 16 in front view.

The multilayer body can now be applied to a banknote 7 again by means of an adhesive layer 57 (FIG. 16I). In this embodiment the substrate film 53 is removed (hot-embossing variant) and no window is provided. The multilayer body 5 displays the desired effect in the case of direct observation from the side of the substrate film 53. As is to be recognized in FIG. 17, the demetalized area 541 again forms the number "55". The demetalized area 561 forms a frame for the surface relief 51, which is, however, covered by the metal layer 54. The oval shape of the multilayer body can be generated by applying the multilayer body 5 to the banknote 7 by means of hot-embossing with a hot-embossing die correspondingly shaped to the oval outer contour. The remaining layers of the multilayer body 5 are peeled off the substrate film 53, and together applied to the banknote 7 as a transfer ply, only in the area where the oval hot-embossing die acts on the substrate film 53 by means of pressure and heat and activates the adhesive layer 57 of the multilayer body 5 preferably formed as a heat-activatable adhesive layer.

A further method for producing a multilayer body 5 with partial demetalization of the metal layers is represented in schematic—not to scale—side views in FIGS. 18A to 18G.

Figure 18A:
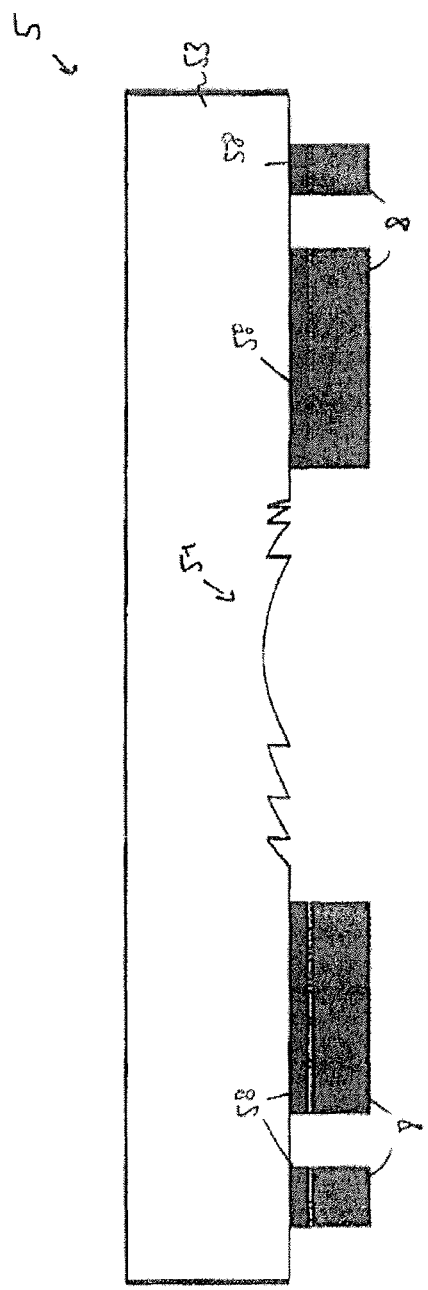
FIG. 18 a schematic representation of the method steps for producing a further alternative embodiment example of a multilayer body with partial demetalization.

An opaque metal layer 58 is also applied here to the substrate film 53 with a surface relief 51 of the described type. This is overprinted with an etch resist 8, which remains omitted in areas to be demetalized. In these areas the metal layer 58 can then be removed by etching (FIG. 18A). In addition the area of the surface relief 51 also initially remains left open here. In this embodiment the etch resist 8 is not removed and can take on additional decorative functions.

Figure 18B:
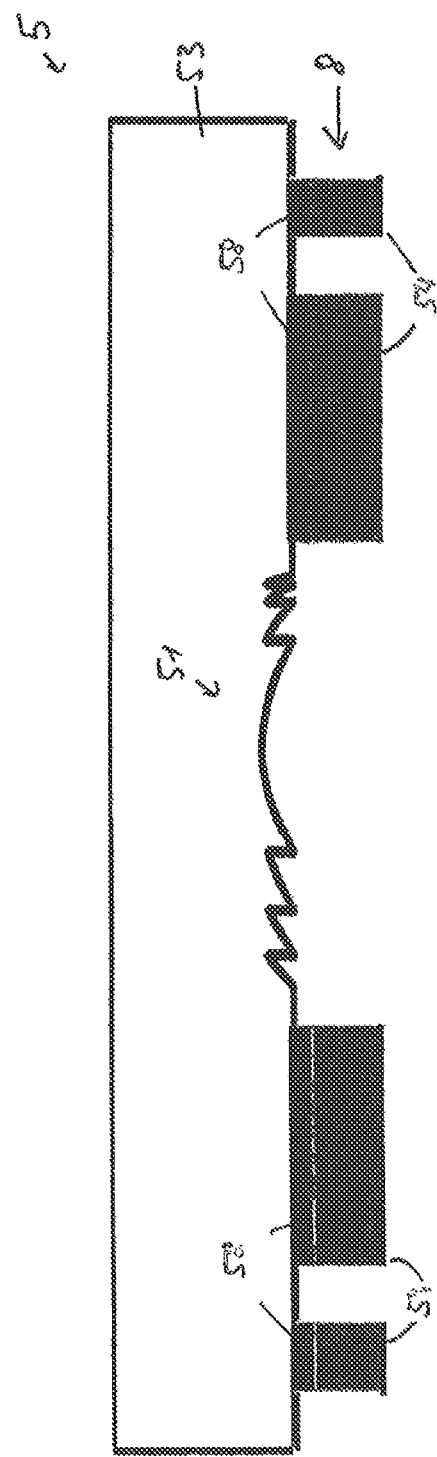
Figure 18C:
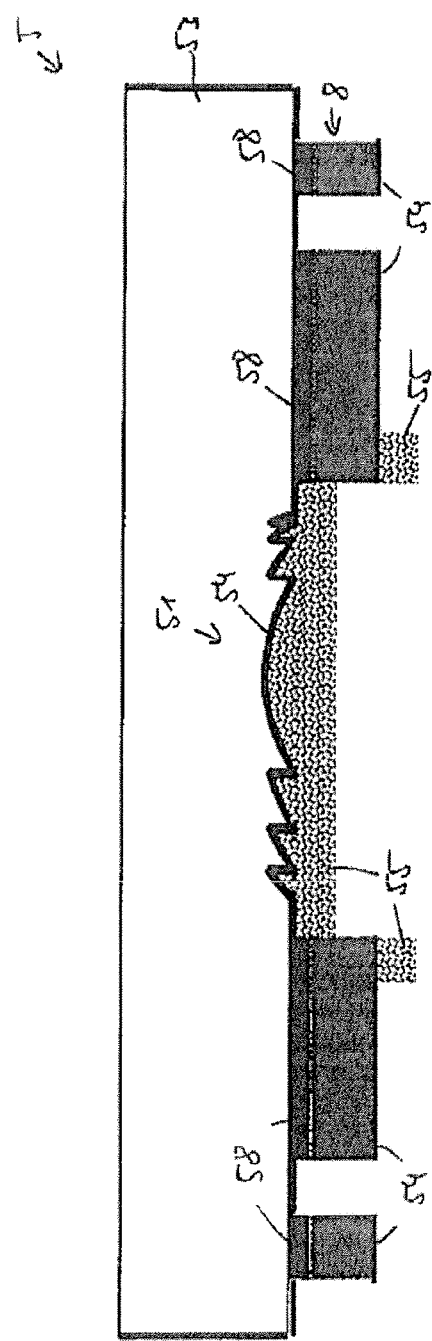
Figure 18D:
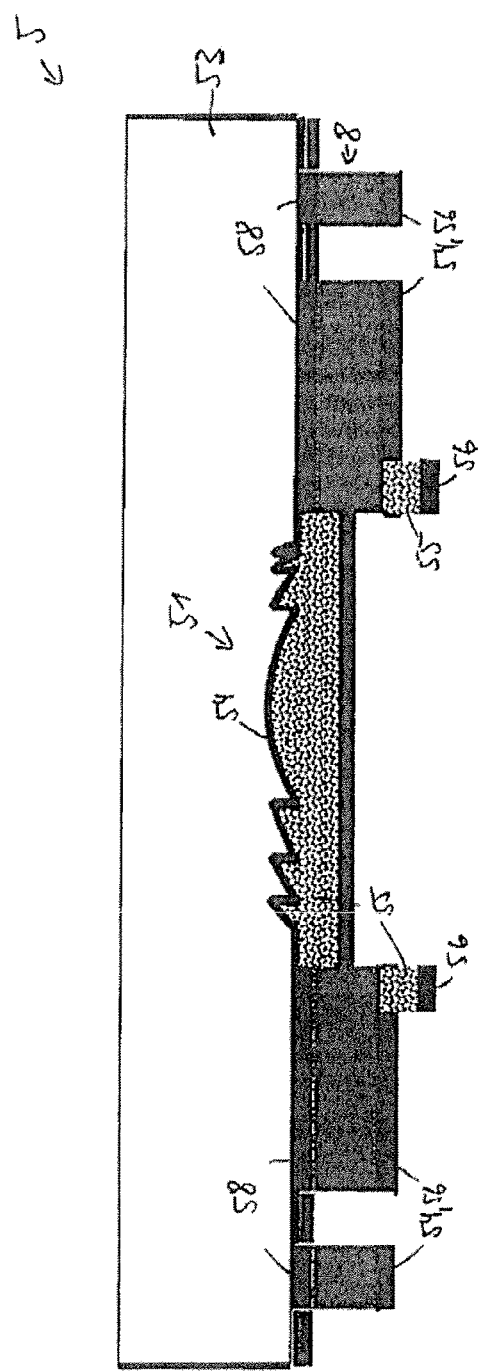

Next, a first metal layer 54 is applied by vapor deposition under vacuum (FIG. 18B). This first metal layer 54 covers, among other things, the surface relief 51. This first metal layer 54 is formed semi-transparent in this embodiment example.

Figure 18E:
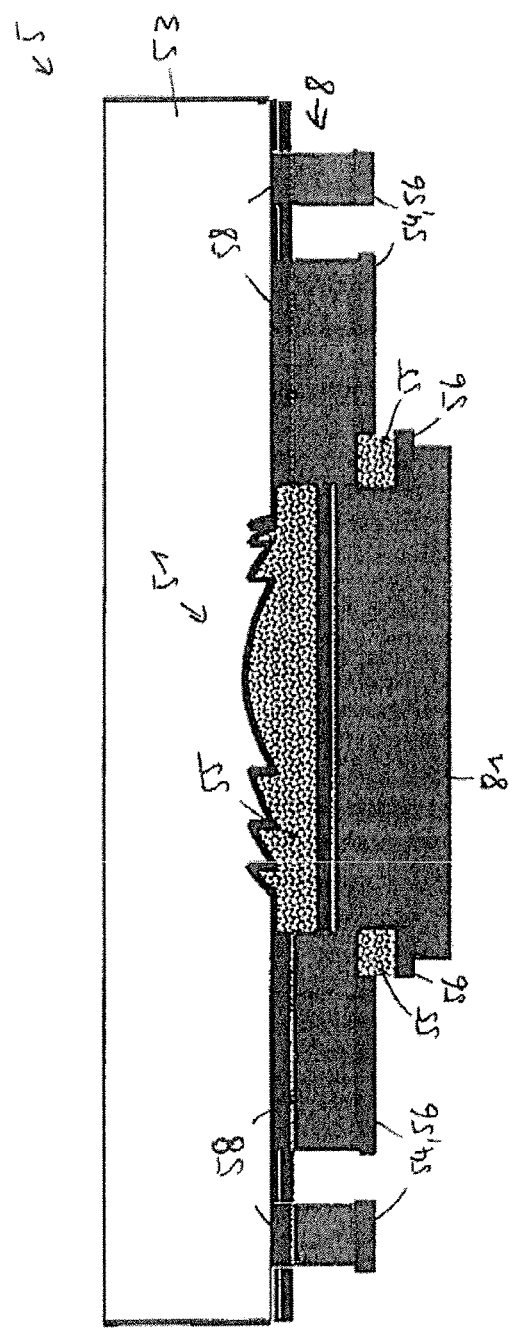

Then the spacer layer 55 is now applied partially and registered relative to the surface relief 51 (FIG. 18C) and vapor-deposited over the whole surface with the second metal layer 56 (FIG. 16D). This second metal layer 56 is formed opaque. In areas which are not provided with the partial spacer layer 55, the second metal layer 56 lies directly on the first metal layer 54. An etch resist 81 is again printed onto the thus-generated second metal layer 56, which is opaque in this embodiment example, partially and registered (FIG. 18E).

Figure 18F:
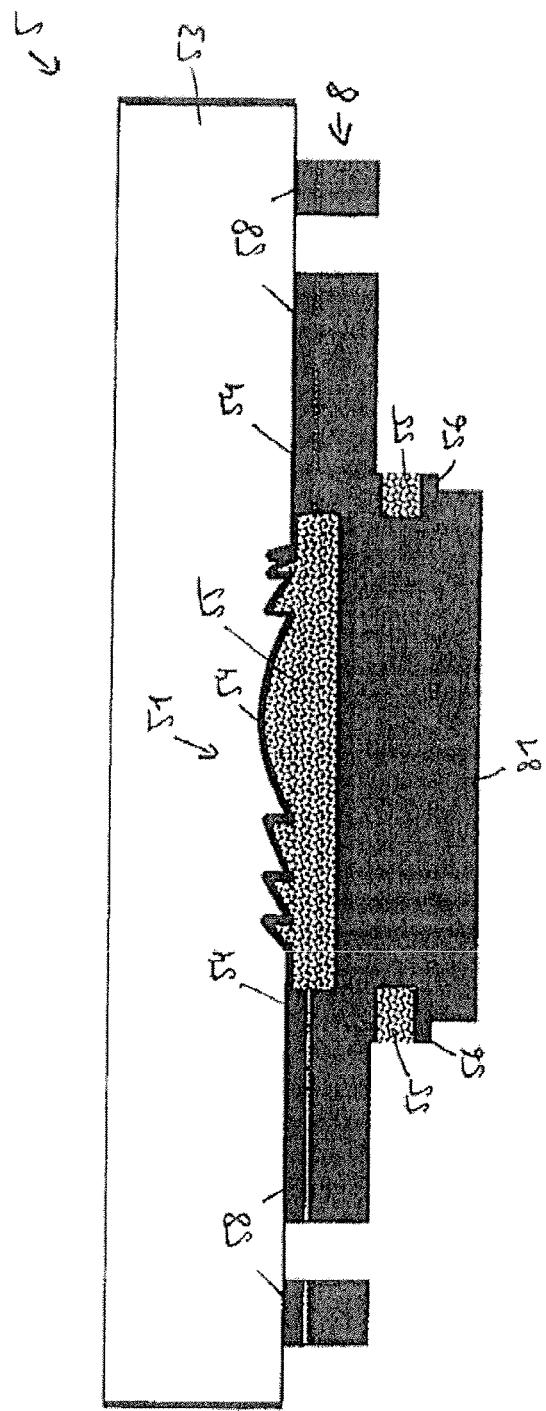

The first 54 and the second 56 metal layers are then removed in one step in the left-open areas by etching (FIG. 18F). For this, the first 54 and the second 56 metal layers must consist of metals which can be removed with the same etching solution. Both metal layers preferably consist of the same metal, in particular preferably both metals consist of aluminum or copper.

Figure 18G:
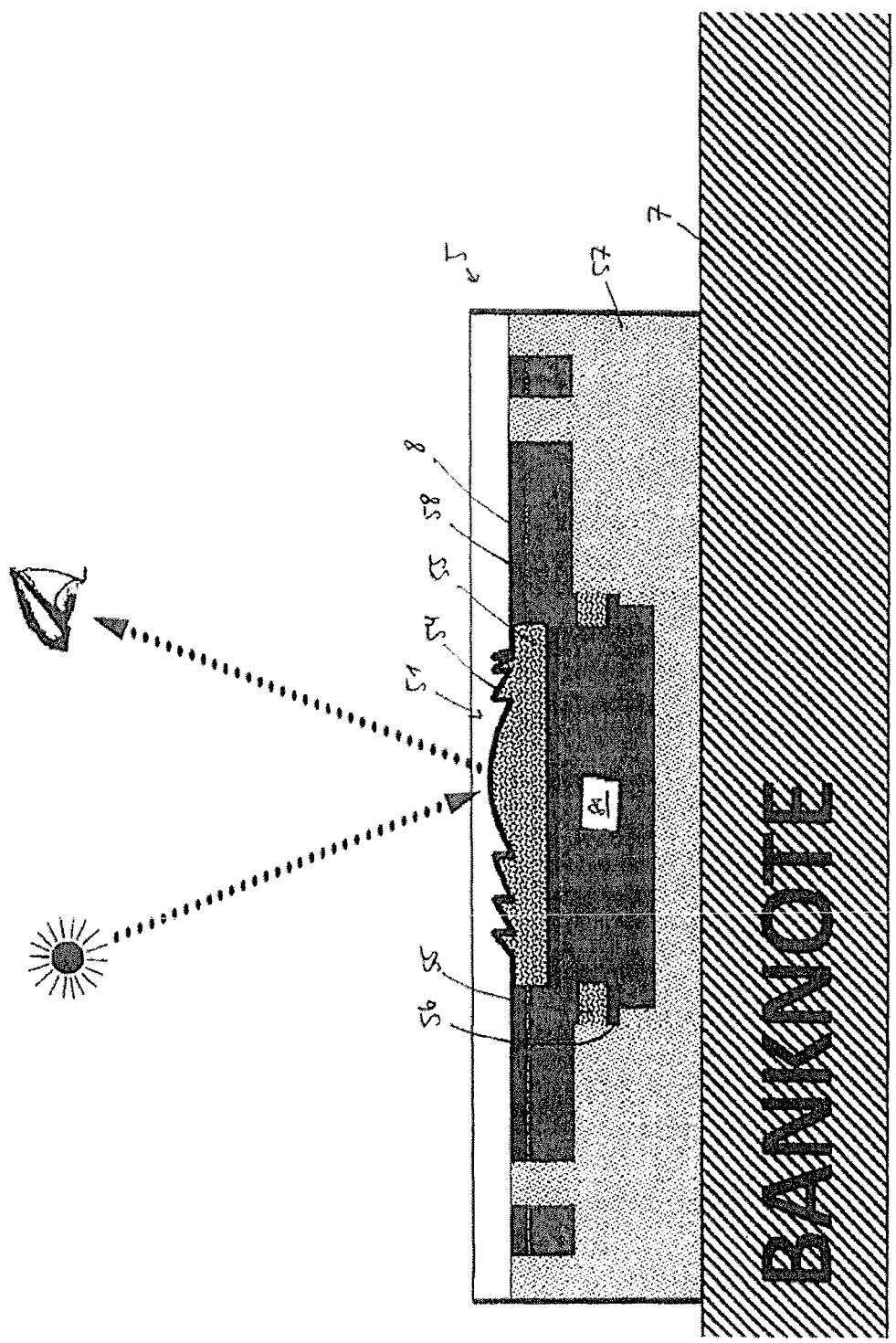

The multilayer body 5 can now be applied to a banknote 7 again by means of an adhesive layer 57 (FIG. 18G). In this embodiment too, the substrate film 53 is removed (hot-embossing variant) and there is no window. The multilayer body 5 displays the desired effect in the case of direct observation from the side of the substrate film. Two demetalizing steps are enough for the method, for this combined design with metallic areas with e.g. diffractive effects and areas with the color tilt effect.

A further method for producing a multilayer body with partial demetalization of the metal layers is represented in schematic—not to scale—side views in FIGS. 19A to 19F.

Figure 19A:
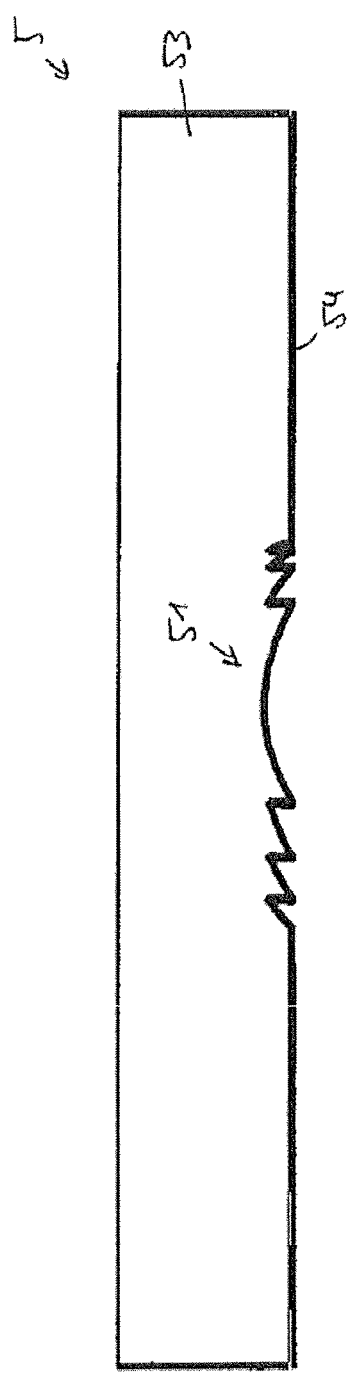
FIG. 19 a schematic representation of the method steps for producing a further alternative embodiment example of a multilayer body with partial demetalization.
Figure 19B:
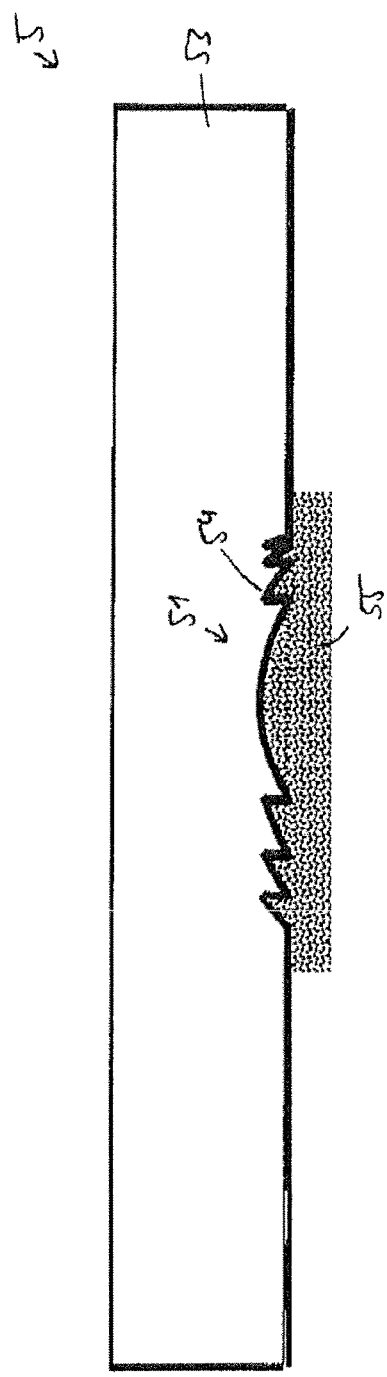
Figure 19C:
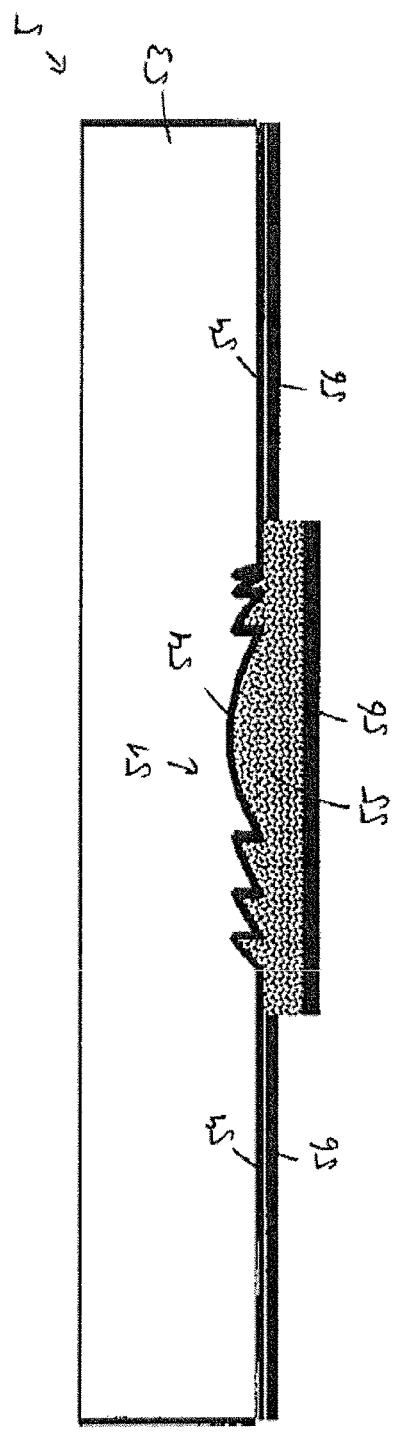
Figure 19D:
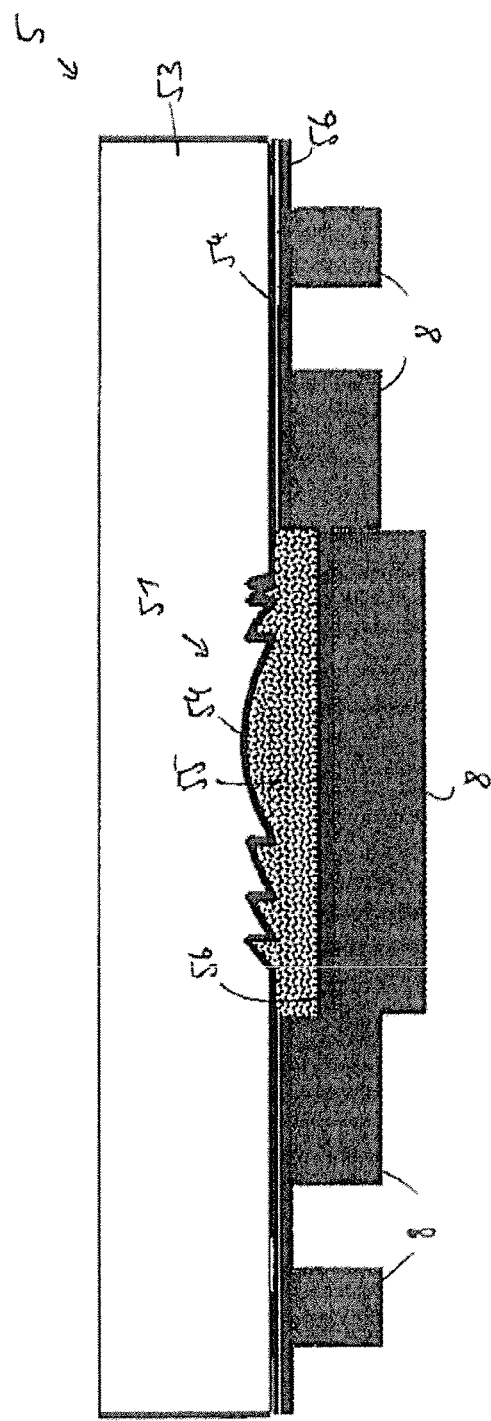
Figure 19E:
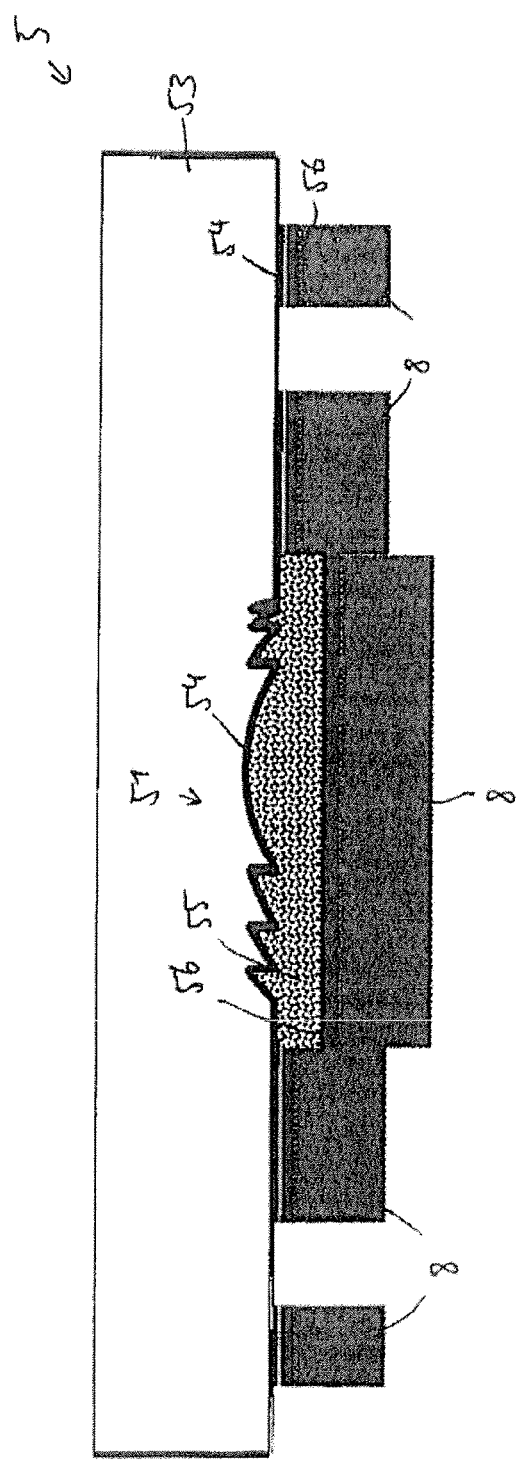

Here too, a semi-transparent metal layer 54 is applied to the substrate film 53 with a surface relief 51 of the described type by vapor deposition under vacuum (FIG. 19A). Then the spacer layer 55 is now applied partially and registered relative to the surface relief 51 (FIG. 19B) and vapor-deposited over the whole surface with the second metal layer 56 (FIG. 19C). This second metal layer 56 is formed opaque. In areas which are not provided with the partial spacer layer 8, the second metal layer 56 lies directly on the first metal layer 54. Metallically diffractive effects are preferably present in these areas. An etch resist 8, which remains omitted in areas to be demetalized, is printed onto the second metal layer 56, which is opaque in this embodiment example, partially and registered (FIG. 19D). The first 54 and the second 56 metal layers are then removed in one step in the left-open areas by etching (FIG. 19E). For this, the first 54 and the second 56 metal layers must consist of metals which can be removed with the same etching solution. Both metal layers preferably consist of the same metal, in particular preferably both metals consist of aluminum or copper.

Figure 19F:
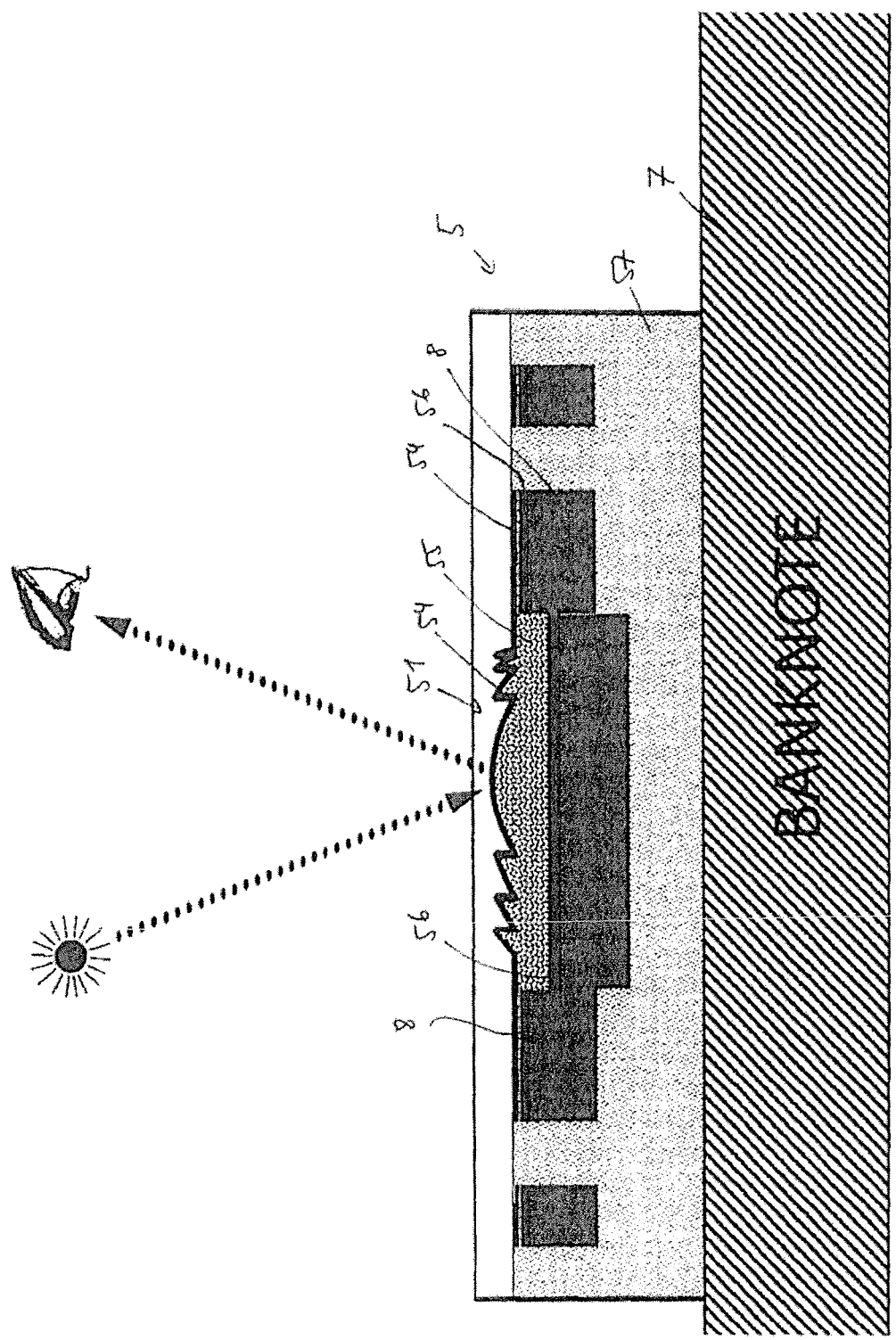

The multilayer body 5 can now be applied to a banknote 7 again by means of an adhesive layer 57 (FIG. 19F). In this embodiment too, the substrate film is removed (hot-embossing variant) and there is no window. The multilayer body 5 displays the desired effect in the case of direct observation from the side of the substrate film. Only one demetalizing step is enough for the method, for this combined design with metallic areas with e.g. diffractive effects and areas with the color tilt effect.

The invention claimed is:

1. A method for producing a multilayer body, with the steps of:
  a) providing a substrate film with a replication layer;
  b) molding a first surface relief into a surface of the replication layer, the first surface relief appearing to the observer in the form of a three-dimensional free-form surface, which is formed by a Fresnel lens structure comprising a diffractive free-form element with a grating structure, the Fresnel lens structure generating a magnifying, demagnifying or distorting effect, the first surface relief being defined by a series of peaks and depressions extending along a plane defined by the surface of the replication layer;
  c) applying a first metal layer to the surface of the replication layer forming the first surface relief;
  d) wet-chemically applying an at least partially transparent spacer layer to the entire surface of the first metal layer, wherein, upon drying of the spacer layer, a second relief structure is formed on a surface of the spacer layer opposite the first relief structure, the second relief structure being defined by a series of peaks and depressions extending along a plane defined by the surface of the replication layer, wherein the peaks and depressions of the second relief structure at least partially correlate with the peaks and depressions of the first relief structure such that the depressions of the second relief structure fall within the depressions of the first relief structure and have a structure depth of at most 90% of a structure depth of the depressions of the first relief structure; and
  e) applying a second metal layer to the dried spacer layer,
  wherein at least one of the two metal layers is formed semi-transparent, and
  wherein, due to the smaller structure depth of the second relief structure as compared to the first relief structure, the thickness of the dried spacer layer varies between the peaks of the first and second relief structures and the depressions of the first and second relief structures resulting in a shape leveling of the surface of the spacer layer having the second relief structure as compared to the surface of the replication layer having the first relief structure, and
  wherein, the thickness of the dried spacer layer is greater in the center, or in areas with a coarse period $\Delta x$, than at the edge, or in areas with a smaller period $\Delta x$ of the relief structures.

2. The method according to claim 1, wherein the spacer layer is applied by gravure printing, curtain coating, slot coating, spin coating or dip coating.

3. The method according to claim 1, wherein the spacer layer is generated by application of a varnish based on nitrocellulose, epoxy, polyester, rosin, acrylate, alkyd, melamine, PVA, PVC, isocyanate or urethane systems.

4. The method according to claim 3, wherein a varnish with a viscosity of from 5 mPa·s to 250 mPa·s, and/or with at least 30% by mass of a solvent with a polarity index greater than 3.0 is used for application of the spacer layer.

5. The method according to claim 1, wherein the spacer layer is applied with a wet layer thickness of from 1 µm to 20 µm.

6. The method according to claim 1, wherein the spacer layer is dried after application at a temperature of from 40° C. to 200° C.

7. The method according to claim 1, wherein the first and/or second metal layer is generated by vacuum deposition of Cr, Al, Cu, Ti, Ni, Ag or Inconel with a layer thickness of from 2 nm to 20 nm.

8. The method according to claim 1, wherein the first or second metal layer is generated by vacuum deposition of Al, Cr, Ag, or Cu, with a layer thickness of from 15 nm to 100 nm.

9. The method according to claim 1, wherein at least one of the first metal layer and the second metal layer are generated by vacuum coating or sputtering.

10. The method according to claim 1, wherein the metal layer and/or the second metal layer is partially demetalized by etching and/or lift-off.

11. The method according to claim 10, wherein the metal layer and/or the second metal layer is demetalized such that a demetalized area of the metal layer and/or of the second metal layer forms a symbol, image, logo, alphanumeric character or a combination thereof.

12. The method according to claim 10, wherein the metal layer and the second metal layer are demetalized such that the demetalized areas overlap in the viewing direction onto the surface normal of the plane spanned by the multilayer body.

13. The method according to claim 10, wherein the metal layer and the second metal layer are demetalized such that a metallic area of one of the metal layers overlaps the outer contour of a demetalized area of the respectively other metal layer.

14. The method according to claim 1, wherein the distance between adjacent peaks of the first and second relief structures in a center area of the multilayer body is defined by a first period, and the distance between adjacent peaks of the first and second relief structures in an edge area of the multilayer body is defined by a second period, the second period being less than the first period, and wherein the thickness of the spacer layer in the center area is greater than the thickness of the spacer layer in the edge area.

15. A multilayer body comprising:
  a substrate film;
  a replication layer applied to a surface of the substrate film, into the surface of which facing away from the substrate film a first surface relief appearing to the observer in the form of a three-dimensional free-form surface is introduced which comprises a Fresnel lens structure comprising a diffractive free-form element with a grating structure, the Fresnel lens structure generating a magnifying, demagnifying or distorting effect, the first surface relief being defined by a series of peaks and depressions extending along a plane defined by the surface of the replication layer;
  a first metal layer or a first high-refractive-index dielectric layer, which is arranged on the surface of the replication layer forming the surface relief;

a wet-chemically applied, at least partially transparent spacer layer, which is applied to a surface of the metal layer or of the high-refractive-index layer facing away from the replication layer, and which forms a second surface relief on a surface of the spacer layer opposite the first relief structure, the second relief structure being defined by a series of peaks and depressions extending along a plane defined by the surface of the replication layer, wherein the peaks and depressions of the second relief structure at least partially correlate with the peaks and depressions of the first relief structure such that the depressions of the second relief structure fall within the depressions of the first relief structure and have a structure depth of at most 90% of a structure depth of the depressions of the first relief structure; and a second metal layer or a second high-refractive-index dielectric layer, which is applied to a surface of the spacer layer facing away from the first metal layer or the first high-refractive-index dielectric layer, wherein, due to the smaller structure depth of the second relief structure as compared to the first relief structure, the thickness of the spacer layer varies between the peaks of the first and second relief structures and the depressions of the first and second relief structures resulting in a shape leveling of the surface of the spacer layer having the second relief structure as compared to the surface of the replication layer having the first relief structure, and wherein, the thickness of the dried spacer layer is greater in the center, or in areas with a coarse period $\Delta x$, than at the edge, or in areas with a smaller period $\Delta x$ of the relief structures.

16. The multilayer body according to claim 15, wherein the structure depth of the first and second surface relief is 200 nm to 2000 nm.

17. The multilayer body according to claim 15, wherein the spacer layer has a dry layer thickness of from 200 nm to 800 nm, wherein the dry layer thickness is variable over the spacer layer in the area of the surface relief appearing in the form of a three-dimensional free-form surface.

18. The multilayer body according to claim 15, wherein the spacer layer has a refractive index of from 1.35 to 1.65.

19. The multilayer body according to claim 15, wherein the surface relief has microstructures with a depth-to-width ratio of less than 0.5.

20. The multilayer body according to claim 15, wherein the grating structure comprises grating lines substantially following the outlines of the free-form surface, wherein the distance between the grating lines changes over the grating structure and changes continuously from the central area of the free-form surface out towards its edge.

21. The multilayer body according to claim 15, wherein a period of the grating lines at least in a partial area of the grating structure is smaller than 50 µm.

22. The multilayer body according to claim 15, wherein the substrate film comprises a flexible PET, PEN, MOPP, PP, PA, PC, COC or PVC material.

23. The multilayer body according to claim 15, wherein the substrate film has a layer thickness of from 4 µm to 500 µm.

24. The multilayer body according to claim 15, wherein the first and/or second metal layer comprises Cr, Al, Cu, Ti, Ni, Ag or Inconel, or wherein the first and second high-refractive-index dielectric layers comprise $TiO_2$, $ZrO_2$ or ZnS.

25. The multilayer body according to claim 15, wherein the first and/or second metal layer has a layer thickness layer thickness of from 2 nm to 20 nm, preferably from 4 nm to 15 nm, or wherein the first and second high-refractive-index dielectric layer has a layer thickness of from 10 nm to 200 nm.

26. The multilayer body according to claim 15, wherein the first or second metal layer has a layer thickness of from 15 nm to 100 nm.

27. The multilayer body according to claim 15, wherein the multilayer body has at least one varnish layer, which is dyed by means of a dye and/or pigment.

28. The multilayer body according to claim 27, wherein the at least one varnish layer is arranged between the replication layer and the metal layer.

29. The multilayer body according to claim 15, wherein the replication layer is dyed by means of a dye and/or pigment.

30. A security document with a multilayer body according to claim 15.

31. The security document according to claim 30, wherein the security document is formed as an identification document, visa document, credit card, or driver's license.

32. The multilayer body according to claim 15, wherein the distance between adjacent peaks of the first and second relief structures in a center area of the multilayer body is defined by a first period, and the distance between adjacent peaks of the first and second relief structures in an edge area of the multilayer body is defined by a second period, the second period being less than the first period, and wherein the thickness of the spacer layer in the center area is greater than the thickness of the spacer layer in the edge area.

33. A method for producing a multilayer body, with the steps of:
   a) providing a substrate film with a replication layer;
   b) molding a first surface relief into a surface of the replication layer, the first surface relief appearing to the observer in the form of a three-dimensional free-form surface, which is formed by a Fresnel lens structure comprising a diffractive free-form element with a grating structure, the Fresnel lens structure generating a magnifying, demagnifying or distorting effect, the first surface relief being defined by a series of peaks and depressions extending along a plane defined by the surface of the replication layer;
   c) applying a first high-refractive-index dielectric layer to the surface of the replication layer forming the surface relief;
   d) wet-chemically applying an at least partially transparent spacer layer to the entire surface of the first dielectric layer, wherein, upon drying of the spacer layer, a second relief structure is formed on a surface of the spacer layer opposite the first relief structure, the second relief structure being defined by a series of peaks and depressions extending along a plane defined by the surface of the replication layer, wherein the peaks and depressions of the second relief structure at least partially correlate with the peaks and depressions of the first relief structure such that the depressions of the second relief structure fall within the depressions of the first relief structure and have a structure depth of at most 90% of a structure depth of the depressions of the first relief structure; and
   e) applying a second high-refractive-index dielectric layer to the spacer layer, wherein the spacer layer has a lower refractive index than the first and the second high-refractive-index layers, wherein, due to the smaller structure depth of the second relief structure as compared to the first relief structure, the thickness of the spacer layer varies between the peaks of the first and second relief structures and the depressions of the first and second relief structures resulting in a shape leveling of the surface of the spacer layer having the second relief structure as compared to the surface of the replication layer having the first relief structure, and wherein, the thickness of the dried spacer layer is greater in the center, or in areas with a coarse period Δx, than at the edge, or in areas with a smaller period Δx of the relief structures.

34. The method according to claim 33, wherein the first and second high-refractive-index dielectric layers are generated by vacuum deposition of TiO2, ZrO2 or ZnS with a layer thickness of from 10 nm to 200 nm.

35. The method according to claim 33, wherein the first and second high-refractive-index dielectric layers are generated by vacuum coating or sputtering.

36. The method according to claim 33, wherein the distance between adjacent peaks of the first and second relief structures in a center area of the multilayer body is defined by a first period, and the distance between adjacent peaks of the first and second relief structures in an edge area of the multilayer body is defined by a second period, the second period being less than the first period, and wherein the thickness of the spacer layer in the center area is greater than the thickness of the spacer layer in the edge area.

* * * * *

UNITED STATES PATENT AND TRADEMARK OFFICE
CERTIFICATE OF CORRECTION

PATENT NO. : 10,882,351 B2  
APPLICATION NO. : 15/543093  
DATED : January 5, 2021  
INVENTOR(S) : Walter et al.

Page 1 of 1

It is certified that error appears in the above-identified patent and that said Letters Patent is hereby corrected as shown below:

In the Claims

Column 22, Lines 2-3:  
Now reads: "layer thickness layer thickness"  
Should read: --layer thickness--.

Signed and Sealed this  
Thirteenth Day of July, 2021

Drew Hirshfeld  
*Performing the Functions and Duties of the*  
*Under Secretary of Commerce for Intellectual Property and*  
*Director of the United States Patent and Trademark Office*